US011511648B2

(12) United States Patent
Yoshida et al.

(10) Patent No.: US 11,511,648 B2
(45) Date of Patent: Nov. 29, 2022

(54) POWER SOURCE DEVICE AND ELECTRIC VEHICLE EQUIPPED WITH POWER SOURCE DEVICE

(71) Applicant: SANYO Electric Co., Ltd., Daito (JP)

(72) Inventors: Naotake Yoshida, Hyogo (JP); Takahide Takeda, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 99 days.

(21) Appl. No.: 16/962,610

(22) PCT Filed: Nov. 15, 2018

(86) PCT No.: PCT/JP2018/042200
§ 371 (c)(1),
(2) Date: Jul. 16, 2020

(87) PCT Pub. No.: WO2019/150705
PCT Pub. Date: Aug. 8, 2019

(65) Prior Publication Data
US 2020/0406784 A1 Dec. 31, 2020

(30) Foreign Application Priority Data
Jan. 30, 2018 (JP) .............................. JP2018-013622

(51) Int. Cl.
*B60K 1/00* (2006.01)
*B60L 58/26* (2019.01)
(Continued)

(52) U.S. Cl.
CPC ............... *B60L 58/26* (2019.02); *B60K 1/00* (2013.01); *B60L 50/64* (2019.02);
(Continued)

(58) Field of Classification Search
CPC ......... B60K 1/04; B60K 1/00; H01M 10/625; H01M 50/20; H01M 10/613;
(Continued)

(56) References Cited

U.S. PATENT DOCUMENTS 9,281,505 B2 * 3/2016 Hihara ................ H01M 8/1072
9,884,545 B1 * 2/2018 Addanki ................ F16F 15/04
(Continued)

FOREIGN PATENT DOCUMENTS

DE     102010005154 A1    7/2011
EP         2530778 A1    12/2012
(Continued)

OTHER PUBLICATIONS

International Search Report dated Dec. 11, 2018, issued in counterpart International Application No. PCT/JP2018/042200 (1 page).
(Continued)

*Primary Examiner* — James A English
*Assistant Examiner* — James J Triggs
(74) *Attorney, Agent, or Firm* — WHDA, LLP

(57) ABSTRACT

A coolant passage, which is included in a cooling plate thermally coupled to a plurality of battery cells and includes longitudinal coolant passages connected to an inlet side and an outlet side for a coolant and lateral coolant passages connecting the longitudinal coolant passages in parallel with each other, cools the battery cells by allowing the coolant to flow in both the longitudinal coolant passages and the lateral coolant passages via the cooling plate.

12 Claims, 16 Drawing Sheets

(51) Int. Cl.
   *H01M 10/613*      (2014.01)
   *H01M 10/625*      (2014.01)
   *H01M 10/647*      (2014.01)
   *H01M 10/6554*     (2014.01)
   *H01M 10/6556*     (2014.01)
   *H01M 10/6568*     (2014.01)
   *B60L 50/64*       (2019.01)
   *H01M 50/20*       (2021.01)

(52) U.S. Cl.
   CPC ....... *H01M 10/613* (2015.04); *H01M 10/625* (2015.04); *H01M 10/647* (2015.04); *H01M 10/6554* (2015.04); *H01M 10/6556* (2015.04); *H01M 10/6568* (2015.04); *H01M 50/20* (2021.01); *H01M 2220/20* (2013.01)

(58) Field of Classification Search
   CPC ......... H01M 10/6554; H01M 10/6556; H01M 10/6558; H01M 10/647; B60L 50/66; B60L 50/64; B60L 58/26
   See application file for complete search history.

(56) References Cited

U.S. PATENT DOCUMENTS

| 2007/0031728 A1* | 2/2007 | Lee ................... H01M 10/6563 |
| | | 429/120 |
| 2013/0004822 A1* | 1/2013 | Hashimoto ....... H01M 10/6554 |
| | | 429/120 |
| 2013/0183555 A1 | 7/2013 | Boddakayala |

FOREIGN PATENT DOCUMENTS

| JP | 2012-94376 A | 5/2012 |
| JP | 2012-190674 A | 10/2012 |
| JP | 2016-81844 A | 5/2016 |

OTHER PUBLICATIONS

Extended (Supplementary) European Search Report dated Feb. 17, 2021 issued in counterpart European Patent Application No. 18904329.2.

* cited by examiner

POWER SOURCE DEVICE AND ELECTRIC VEHICLE EQUIPPED WITH POWER SOURCE DEVICE

TECHNICAL FIELD

The present invention relates to a power source device in which a plurality of battery cells are thermally coupled to a cooling plate for cooling, and an electric vehicle including the power source device.

BACKGROUND ART

High-power power source devices, which are installed in vehicles, such as hybrid cars and electric automobiles, to supply electric power to their traction motor, charge and discharge a large current and are used under various external conditions, which may develop a temperature rise in the battery cells forming the battery unit. Such a temperature rise of the battery cells is a cause of a decrease in the life of the battery cell. Power source devices having a cooling mechanism for suppressing a temperature rise of battery cells have been developed (See PTL 1).

The power source device described in PTL 1 dissipates heat by thermally coupling a plurality of battery cells to a cooling plate to transfer heat energy of the battery cells to the cooling plate. The cooling plate is forcedly cooled by the coolant circulating in the coolant passage to dissipate the heat energy conducted from the battery cells. The coolant, for which cooling water (e.g., water or antifreeze) is used, is cooled externally, and cools the cooling plate.

CITATION LIST

Patent Literature

PTL 1: Unexamined Japanese Patent Publication No. 2012-94376

SUMMARY OF THE INVENTION

The power source device in which the battery cells are thermally coupled to the cooling plate to dissipate heat energy of the battery cells is configured to cool the cooling plate with the circulating coolant and cool the battery cells with the cooled cooling plate. The power source device with this structure is capable of maintaining each battery cell in a preferable range of temperature by cooling the heating battery cells in a normal use environment. However, such a power source device cannot effectively prevent a chain of thermal runaway of the battery cells in a state in which the coolant is not circulating in the cooling plate, i.e., in a state in which the power source device is not activated, for example, when the vehicle is stopped.

The present invention has been made to solve the above problem, and an object of the present invention is to provide a technique that ensures high safety by effectively preventing a chain of thermal runaway even when the power source device is not activated.

A power source device according to one aspect of the present invention includes: a plurality of battery cells 1; cooling plate 3 thermally coupled to battery cells 1 and including coolant passages 8; and circulator 9 configured to circulate a coolant in coolant passages 8 of cooling plate 3. Cooling plate 3 has one surface thermally coupled battery cells 1, coolant passages 8 includes longitudinal coolant passages 8A connected to an inlet side and an outlet side for the coolant, and lateral coolant passages 8B that connect longitudinal coolant passages 8A in parallel with each other, and cooling plate 3 has a structure for cooling that allows the coolant to now in both longitudinal coolant passages 8A and lateral coolant passages 8B.

A power source device according to another aspect of the present invention includes: a plurality of battery cells 1; cooling plate 3 thermally coupled to battery cells 1 and including coolant passages 8; and circulator 9 configured to circulate a coolant in coolant passages 8 of cooling plate 3. Cooling plate 3 has at least one surface thermally coupled to battery cells 1, coolant passages 8 includes protrusions 37, 38 at a portion of cooling plate 3 where battery cells 1 are thermally coupled, and cooling plate 3 has a structure for cooling that allows the coolant to flow along surfaces of protrusions 37, 38.

A power source device according to another aspect of the present invention includes: a plurality of battery cells 1; cooling plate 3 thermally coupled to battery cells 1 and including coolant passages 8; and circulator 9 configured to circulate a coolant in coolant passages 8 of cooling plate 3. Cooling plate 3 has at least one surface thermally coupled to battery cells 1, coolant passages 8 includes inclined surfaces 39 at a portion of cooling plate 3 where battery cells 1 are thermally coupled, and cooling plate 3 has a structure for cooling that allows the coolant to flow along inclined surfaces 39.

An electric vehicle equipped with the power source device according to any one of the above aspects, the electric vehicle includes: power source device 100; traction motor 93 configured to receive power from power source device 100; vehicle body 90 including power source device 100 and traction motor 93; and wheels 97 driven by traction motor 93 to run vehicle body 90.

The power source device according to any one of the above aspects ensures high safety by effectively preventing a chain of thermal runaway even when any of the battery cells undergoes a thermal runaway in a state in which the power source device is not activated. This feature is achieved because the above power source devices include the coolant passage, which is included in the cooling plate thermally, coupled to the battery cells and includes the longitudinal coolant passages connected to an inlet side and an outlet side for a coolant and the lateral coolant passages connecting the longitudinal coolant passages in parallel with each other, and cools the cooling plate by allowing the coolant to flow in both the longitudinal coolant passages and the lateral coolant passages. The above power source devices effectively prevent a chain of thermal runaway when any of the battery cells undergoes a thermal runaway even in a state in which the battery is not charged and discharged, especially in a state in which the vehicle equipped with the power source device is not traveled. This feature is achieved because the above power source devices have lateral coolant passages connected to the longitudinal coolant passages inside the cooling plate. If any of the battery cells undergoes a thermal runaway and the temperature thereof rises abnormally, the battery cell undergoing a thermal runaway locally heats the cooling plate, which causes the heated coolant to self-circulate by flowing in the longitudinal coolant passages or the lateral coolant passages. Particularly when the coolant boils and vaporizes in the heated portion, a large amount of heat of vaporization cools the cooling plate, and in addition, the vaporized coolant expands 1000 times in volume and are quickly flown away from the heated portion. The coolant flown away from the heated portion flows to an area having a temperature lower than the boiling point of the coolant, and liquefies there while dissipating heat. The liquefied coolant circulates to the heated portion and cools the heated portion again. In this state, the self-circulating coolant cools with the heat of vaporization the heated portion where the battery cell undergoing a thermal runaway is thermally coupled, and then liquefies while dissipating the heat of the heated portion in an area away from the heated portion. The coolant self-circulates while repeating vaporization and liquefaction, which prevents a chain of thermal runaway.

Furthermore, the above described power source device according to another aspect ensures high safety by effectively preventing a chain of thermal runaway even if any of the battery cells undergoes a thermal runaway in a state in which the power source device is not activated. This feature is achieved by the structure in which the coolant passage provided in the cooling plate that is thermally coupled to the battery cells has protrusions or inclined surfaces at a portion of the cooling plate where the battery cells are thermally coupled, and the coolant flows along the surfaces of the protrusions or along the inclined surfaces. The above power source devices effectively prevent a chain of thermal runaway when any of the battery cells undergoes a thermal runaway even in a state in which the battery is not charged and discharged, especially in a state in which the vehicle equipped with the power source device is not traveled. This feature is achieved by the structure in which the coolant passage included in the cooling plate includes the protrusions or the inclined surfaces, and thus, if any of the battery cells undergoes a thermal runaway and the temperature thereof rises abnormally, the battery cell undergoing a thermal runaway locally heats the cooling plate and the heated coolant flows along the surfaces of the protrusions or along the inclined surfaces, thereby self-circulating inside the coolant passage.

DESCRIPTION OF EMBODIMENTS

Figure 1:
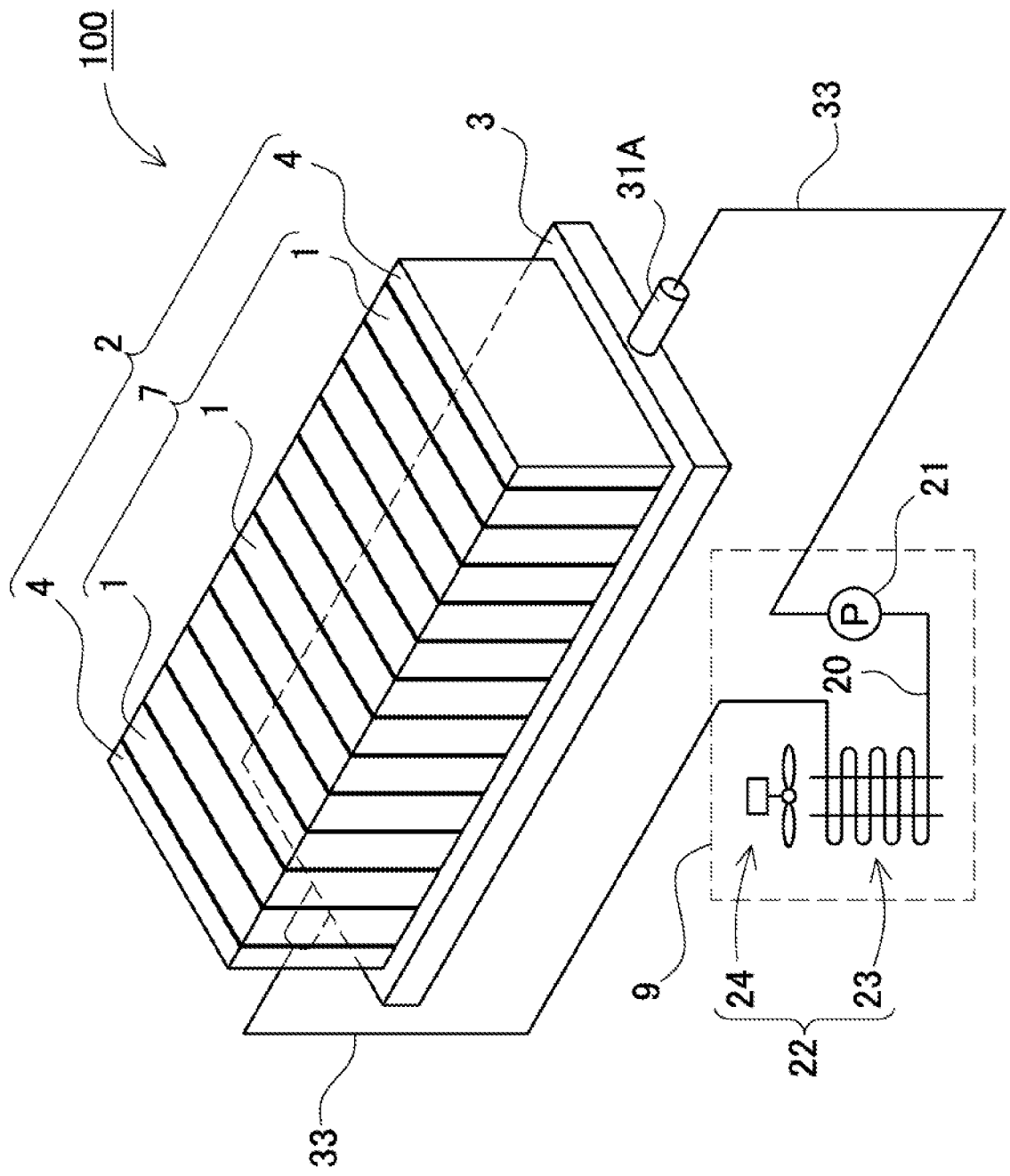
FIG. 1 is a schematic perspective view of a power source device according to an exemplary embodiment of the present invention.

First, a point to be noted of the present invention will be described. The power source device in which the battery cells are thermally coupled to the cooling plate to dissipate heat energy of the battery cells is configured to cool the cooling plate with the circulating coolant and cool the battery cells with the cooled cooling plate. In particular, a power source device in which a large number of battery cells are thermally coupled to a cooling plate for cooling is capable of efficiently dissipating heat energy of the battery cells, and is frequently used as a large-capacity and large-output power source device, and thus high-performance secondary batteries, such as lithium-ion secondary batteries, are used as the battery cells. This type of battery cells tend to have an abnormally high temperature in case of thermal runaway, and thus preventing a chain of thermal runaway is essential to ensure safety. Preventing a chain of thermal runaway of the battery cells is extremely important for this power source device especially in a state in which coolant is not circulating in the cooling plate, i.e., in a state in which the power source device is not activated, for example, when the vehicle is stopped. This is because in this state, the coolant is not forced to circulate in the cooling plate by the circulation pump, and heat energy of the battery undergoing a thermal runaway cannot be cooled by the circulating coolant. The thermal runaway of the battery cells occurs irrespective of a usage state of the power source device, and the occurrence thereof cannot be prevented completely even when the battery cells are not charged or discharged.

A power source device in which adjacent battery cells are thermally coupled to a cooling plate dissipates heat by transferring heat energy of the battery cells to the cooling plate. Since adjacent battery cells are thermally coupled to the cooling plate, heat energy of a battery cell undergoing a thermal runaway is transferred to adjacent the battery cells through the cooling plate, and this thermal transfer can cause a chain of thermal runaway among adjacent battery cells. If a thermal runaway occurs in one of the battery cells particularly in a state in which the coolant is not circulating in the cooling plate, i.e., in a state in which the power source device is not charged or discharged, the cooling plate cannot be forcedly cooled by the coolant, which allows heat energy of the battery cell undergoing a thermal runaway to be transferred to adjacent the battery cells, thereby increasing the probability of occurrence of a chain of thermal runaway. In view of the above, it is important for the power source device to ensure high safety by effectively preventing a chain of thermal runaway even in a state in which the power source device is not activated.

A power source device according to an aspect of the present invention may be specified by the following configurations. The power source device includes: a plurality of battery cells 1; cooling plate 3 thermally coupled to battery cells 1 and including coolant passages 8; and circulator 9 configured to circulate a coolant in coolant passages 8 of cooling plate 3. Cooling plate 3 has at least one surface thermally coupled battery cells 1, coolant passages 8 includes longitudinal coolant passages 8A connected to an inlet side and an outlet side for the coolant, and lateral coolant passages 8B that connect longitudinal coolant passages 8A in parallel with each other, and cooling plate 3 has a structure for cooling that allows the coolant to flow in both longitudinal coolant passages 8A and lateral coolant passages 8B.

In the power source device, longitudinal coolant passages 8A may be connected with lateral coolant passages 8B in a grid pattern.

A power source device according to another aspect of the present invention includes: a plurality of battery cells 1; cooling plate 3 thermally coupled to battery cells 1 and including coolant passages 8; and circulator 9 configured to circulate a coolant in coolant passages 8 of cooling plate 3. Cooling plate 3 has at least one surface thermally coupled to battery cells 1, coolant passages 8 includes protrusions 37, 38 at a portion of cooling plate 3 where battery cells 1 are thermally coupled, and cooling plate 3 has a structure for cooling that allows the coolant to flow along surfaces of protrusions 37, 38.

A power source device according to another aspect of the present invention includes: a plurality of battery cells 1; cooling plate 3 thermally coupled to battery cells 1 and including coolant passages 8; and circulator 9 configured to circulate a coolant in coolant passages 8 of cooling plate 3. Cooling plate 3 has at least one surface thermally coupled to battery cells 1, coolant passages 8 includes inclined surfaces 39 at a portion of cooling plate 3 where battery cells 1 are thermally coupled, and cooling plate 3 has a structure for cooling that allows the coolant to flow along inclined surfaces 39.

In the power source device, battery cell 1 may be a prismatic battery cell, and either or both of bottom surface 1A and side surface 1B of the prismatic battery cell may be fixed to cooling plate 3 in a thermally coupled state.

Furthermore, an electric vehicle equipped with the power source device according to any one of the above aspects may include: power source device 100; traction motor 93 configured to receive power from power source device 100; vehicle body 90 including power source device 100 and traction motor 93; and wheels 97 driven by traction motor 93 to run vehicle body 90.

Hereinafter, exemplary embodiments of the present invention will be described with reference to the drawings. However, the exemplary embodiments described below show only an example that allows a technical idea of the present invention to be embodied, and the present invention is not limited to the following embodiments. The present description never limits the members recited in the claims to the members in the exemplary embodiments. In particular, the sizes, materials, and shapes of the components and relative arrangement between the components described in the exemplary embodiments are not intended to limit the scope of the present invention, but a mere example for explanation unless otherwise specified. Note that the sizes and positional relation of the components in each figure may be exaggerated for clear explanation. Furthermore, in the following description, same names or same reference marks denote same components or same types of components, and detailed description is therefore appropriately omitted. Regarding the elements of the present invention, a plurality of elements may be formed of the same component, and one component may serve as the plurality of elements. To the contrary, the function of one component may be shared by the plurality of components. In addition, the description in some examples or exemplary embodiments may be applied to other examples, exemplary embodiments, and the like.

Exemplary Embodiment 1

Power source device 100 shown in the schematic configuration diagram of FIG. 1 includes: battery unit 2 formed of a plurality of battery cells 1; and cooling plate 3 fixed to battery cells 1 of battery unit 2 in a thermally coupled state to dissipate heat energy of battery cells 1.

(Battery Unit 2)

Figure 2:
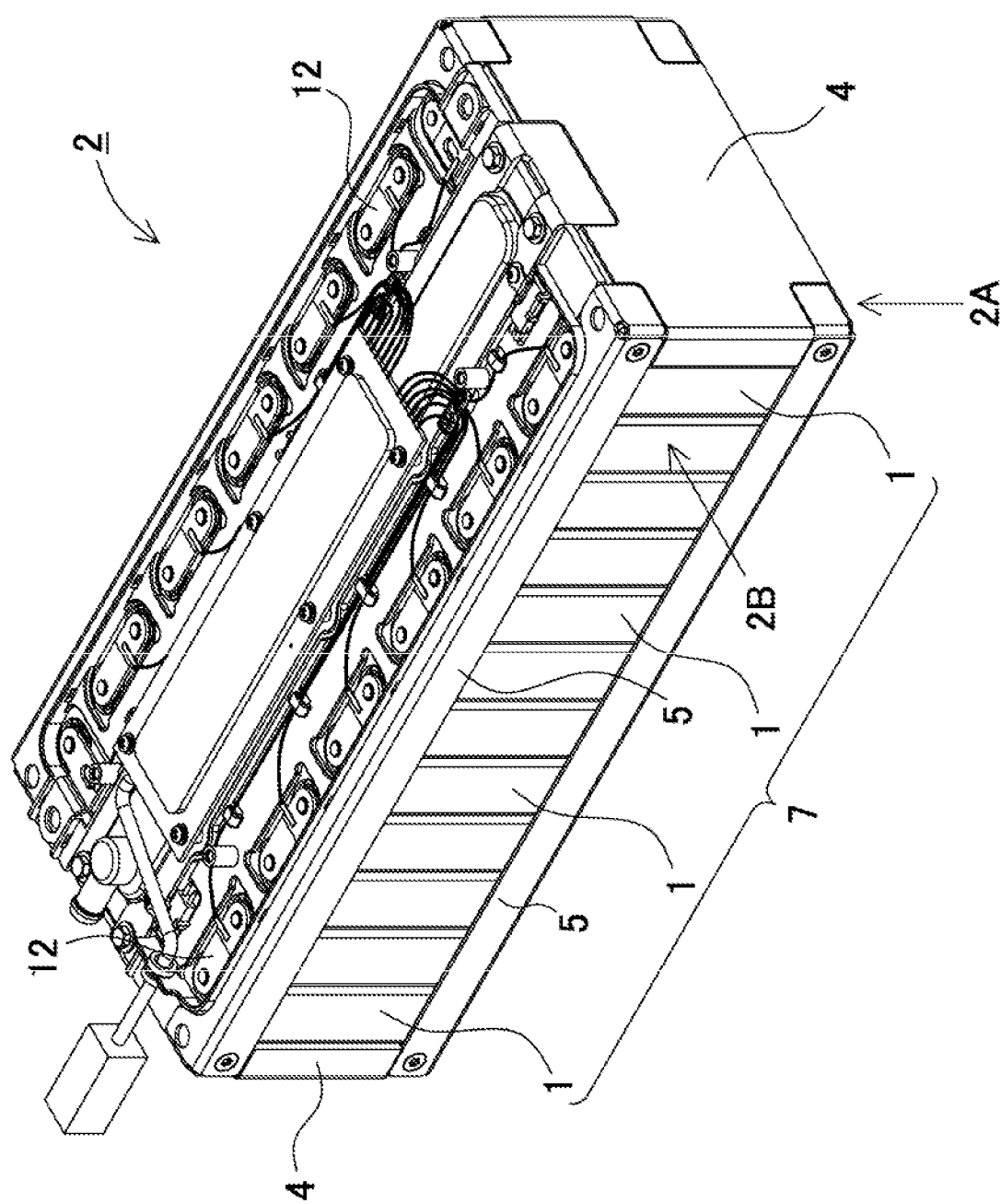
FIG. 2 is a perspective view showing an example of a battery unit of the power source device shown in FIG. 1.
Figure 3:
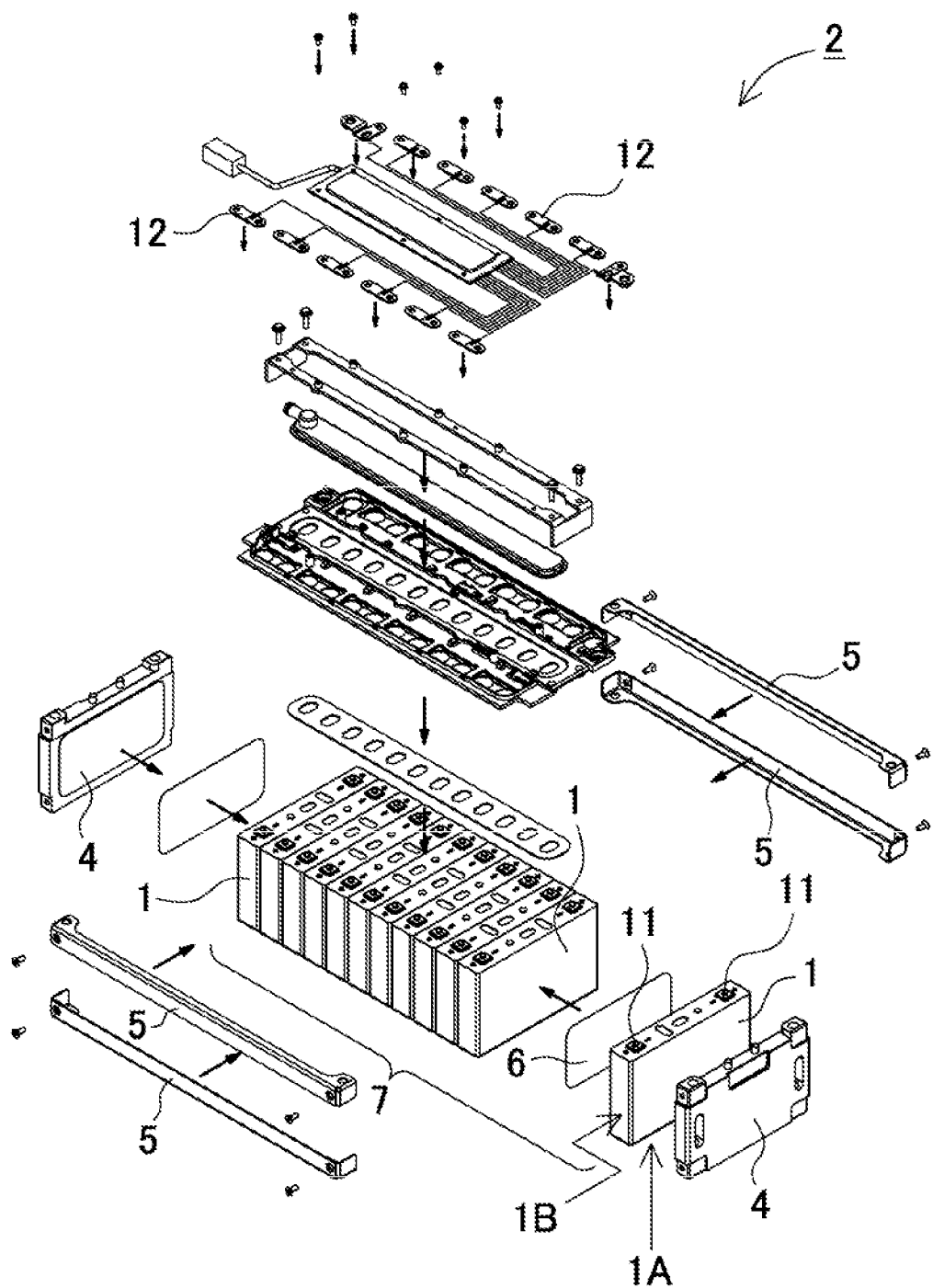
FIG. 3 is an exploded perspective view of the battery unit shown in FIG. 2.

As shown in FIGS. 2 and 3, in battery unit 2, battery cells 1 are stacked to form battery stack 7, on either end surface of battery stack 7 a pair of end plates 4 are disposed, and end plates 4 are connected through connecting members 5. Each connecting member 5 has both ends thereof being fixed to end plates 4, and secures stacked battery cells 1 in a pressed state. Battery cells 1 in the figure are a prismatic battery. In battery stack 7, battery cells 1, which is a prismatic battery, are stacked in a thickness direction of battery cells 1 with insulating separators 6 interposed therebetween. Battery cells 1 are a lithium ion secondary battery. However, the battery cells are not limited to a lithium ion secondary battery, and may be any rechargeable battery, such as a nickel-metal hydride battery cell.

(Battery Cell 1)

Each battery cell 1 is formed by accommodating an electrode body (not shown), in which positive and negative electrode plates are stacked, in an airtightly-sealed exterior can that is filled with an electrolyte solution. The opening of the exterior can is airtightly closed by a sealing plate. The exterior can is made of a metal sheet, such as aluminum or aluminum alloy, by a deep-drawing technique, and the sealing plate insulates and fixes positive and negative electrode terminals 11. The exterior can formed of metal has good heat conduction, thereby allowing bottom surface 2A or side surface 2B of battery unit 2 to serve as a surface for thermal coupling and to be fixed to a surface of cooling plate 3 in a thermally coupled state.

(Separator 6)

Separators 6 each are formed of an insulating material, such as plastic, and insulate stacked battery cells 1 from each other. Each separator 6 is sandwiched between battery cells 1 to insulate adjacent battery cells 1. In battery unit 2, bus bar 12 is fixed to electrode terminals 11 of stacked battery cells 1 to connect individual battery cells 1 in series or connect a plurality of parallel-connected battery cells 1 in series. Battery unit 2 can increase its output voltage by connecting battery cells 1 in series to produce a large output, and can increase its charging/discharging current by connecting adjacent battery cells 1 in parallel.

Power source device 100 dissipates heat energy of cooling plate 3 by disposing cooling plate 3 on one or both of bottom surface 2A and side surface 2B of battery unit 2, thereby limiting a temperature rise of battery unit 2. In power source device 100 shown in FIG. 1, cooling plate 3 is disposed on bottom surface 2A of battery unit 2. In the power source device, a vertical cooling plate may be arranged between the battery units, or cooling plates may be arranged both of between the battery units and on the bottom surfaces of the battery units to dissipate heat energy of the battery cells. In the power source device of FIG. 1, battery cells 1 are erected and electrode terminals 11 are arranged on an upper surface of each battery cell 1, but the battery cells may be arranged sideways or inverted, and the cooling plate may be disposed on a bottom surface of the battery unit or between the battery units.

(Cooling Plate 3)

Figure 4:
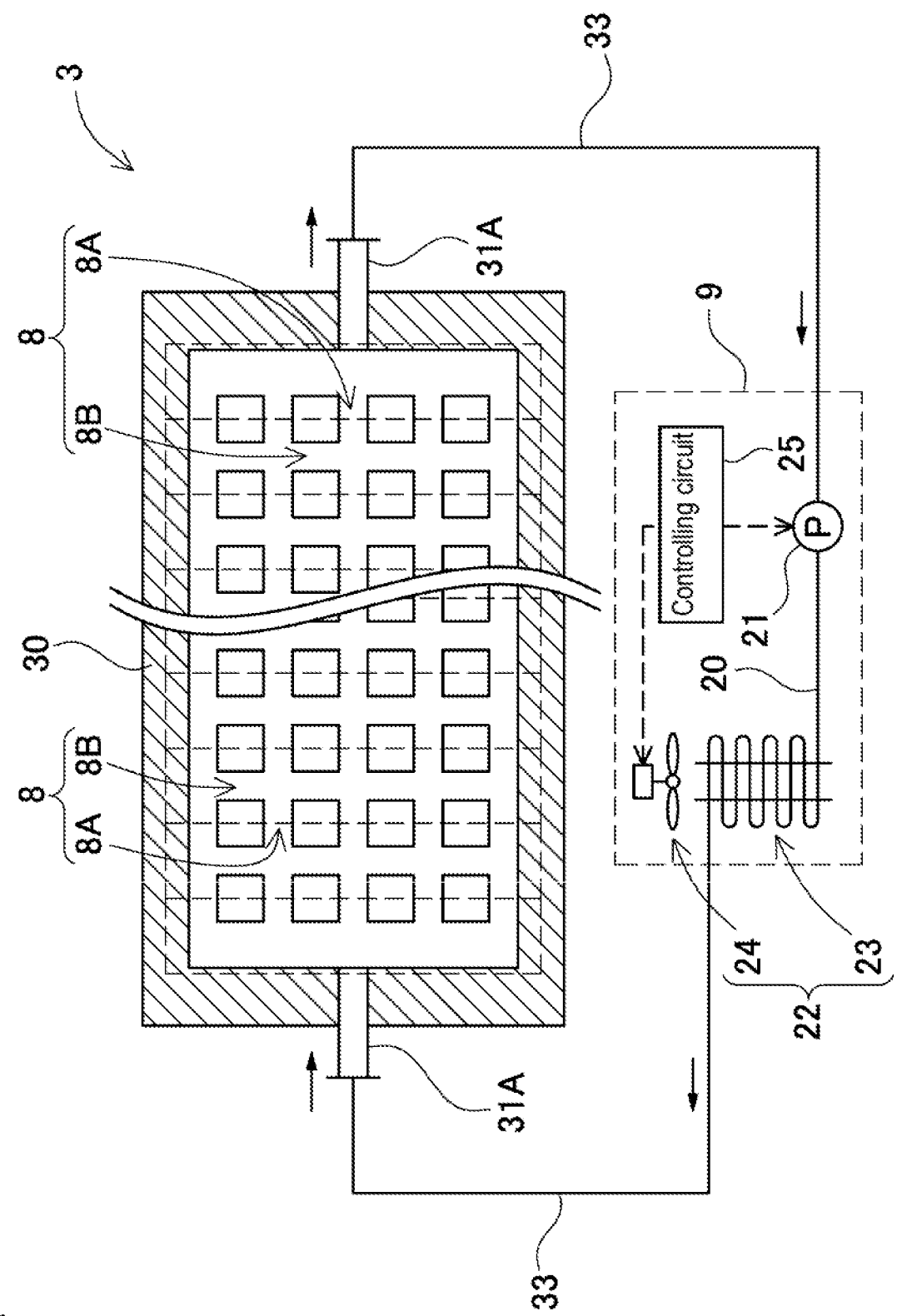
FIG. 4 is a horizontal sectional view showing an example of a cooling plate and a circulator.

Cooling plate 3 is fixed to bottom surface 1A or side surface 1B of each battery cell 1 in a thermally coupled state to dissipate heat energy of each battery cell 1. Cooling plate 3 is forcedly cooled by circulating a coolant in coolant passages 8 disposed in cooling plate 3, as shown in FIG. 4. Cooling water is used as the coolant. As the cooling water, antifreeze mixed with alcohol or the like is used to lower its freezing temperature. However, other liquid that vaporizes at a temperature generated by battery cells 1 can be used as the coolant. Cooling plate 3 has coolant passages 8 for circulating the coolant inside cooling plate 3.

FIG. 4 shows a horizontal section of cooling plate 3 and coolant passages 8 disposed therein, in which outer shapes of battery cells 1 are shown by the chain lines. Coolant passages 8 in this figure include: a plurality of longitudinal coolant passages 8A that are connected to the inlet side and the outlet side for the coolant; and lateral coolant passages 8B that connect adjacent longitudinal coolant passages 8A in parallel. Cooling plate 3 allows the coolant flown to the inlet side of coolant passages 8 to flow through longitudinal coolant passages 8A toward the outlet side to be discharged therefrom. Coolant passages 8 not only allow the coolant to flow in longitudinal coolant passages 8A, but also allow the coolant flowing in longitudinal coolant passages 8A to flow to adjacent longitudinal coolant passages 8A via lateral coolant passages 8B.

In a state in which specific one of battery cells 1 has an abnormally high temperature, for example, in a state in which a thermal runaway occurs in one of battery cells 1 and the temperature thereof becomes extremely high, i.e., several hundreds of degrees Celsius or more, lateral coolant passages 8B enables quick movement of the coolant, thereby efficiently dissipating heat energy of battery cell 1 having a high temperature. This configuration is extremely important for cooling plate 3. This is because one battery cell 1 undergoing a thermal runaway heats adjacent battery cells 1 and causes a chain of thermal runaway in a large number of battery cells 1. When a chain of thermal runaway occurs in a large number of battery cells 1, extremely increased amount of heat energy is generated. This adverse effect can be prevented by efficiently dissipating the heat energy generated instantaneously by battery cell 1 undergoing a thermal runaway by using cooling plate 3. It is essential to make the coolant flow quickly to efficiently dissipate excessive heat energy generated instantaneously by battery cell 1 undergoing a thermal runaway by using cooling plate 3. This is because the coolant forcedly cools cooling plate 3. It is essential to efficiently dissipate the heat energy generated instantaneously by battery cell 1 undergoing a thermal runaway, especially in a state in which circulation pump 21 is suspended. This is because the coolant is not forced to circulate while circulation pump 21 is suspended.

Not only when the coolant is forcedly circulated, but also when the coolant is not forcedly circulated due to suspension of circulation pump 21, cooling plate 3 with lateral coolant passages 8B dissipates heat energy of battery cell 1 having an abnormally increased temperature due to thermal runaway, thereby preventing occurrence of a chain of thermal runaway. Cooling plate 3 uses the heat energy of battery cell 1 with an abnormally increased temperature to cause the coolant to self-circulate, thus cooling the coolant. Particularly when the coolant is boiled by large heat energy of battery cell 1 undergoing a thermal runaway, the heat energy of battery cell 1 undergoing a thermal runaway is efficiently absorbed due to a large amount of heat of vaporization generated by the boiling coolant. The coolant boils when battery cell 1 heated by thermal runaway reaches a temperature of several hundred degrees Celsius. The cooling water used for the coolant has an extremely large amount heat of vaporization of about 540 cal/g, and absorbs 54 times as much as heat energy that increases the water temperature by 10° C., and thus the boiling coolant absorbs a large amount of heat energy to cool battery cell 1 undergoing a thermal runaway.

A thermal runaway occurs in battery cells 1 with extremely low probability. Therefore, a plurality of battery cells 1 do not simultaneously undergo thermal runaway due to self-heating. Cooling plate 3 is only required to quickly dissipate the heat energy generated instantaneously by one battery cell 1 undergoing a thermal runaway. Further, forced cooling of cooling plate 3 by the heat of vaporization generated by the boiling coolant is only required to quickly dissipate the heat of a portion of cooling plate 3, and is not required to continuously cool cooling plate 3 to a set temperature unlike the coolant circulating therein.

Figure 5:
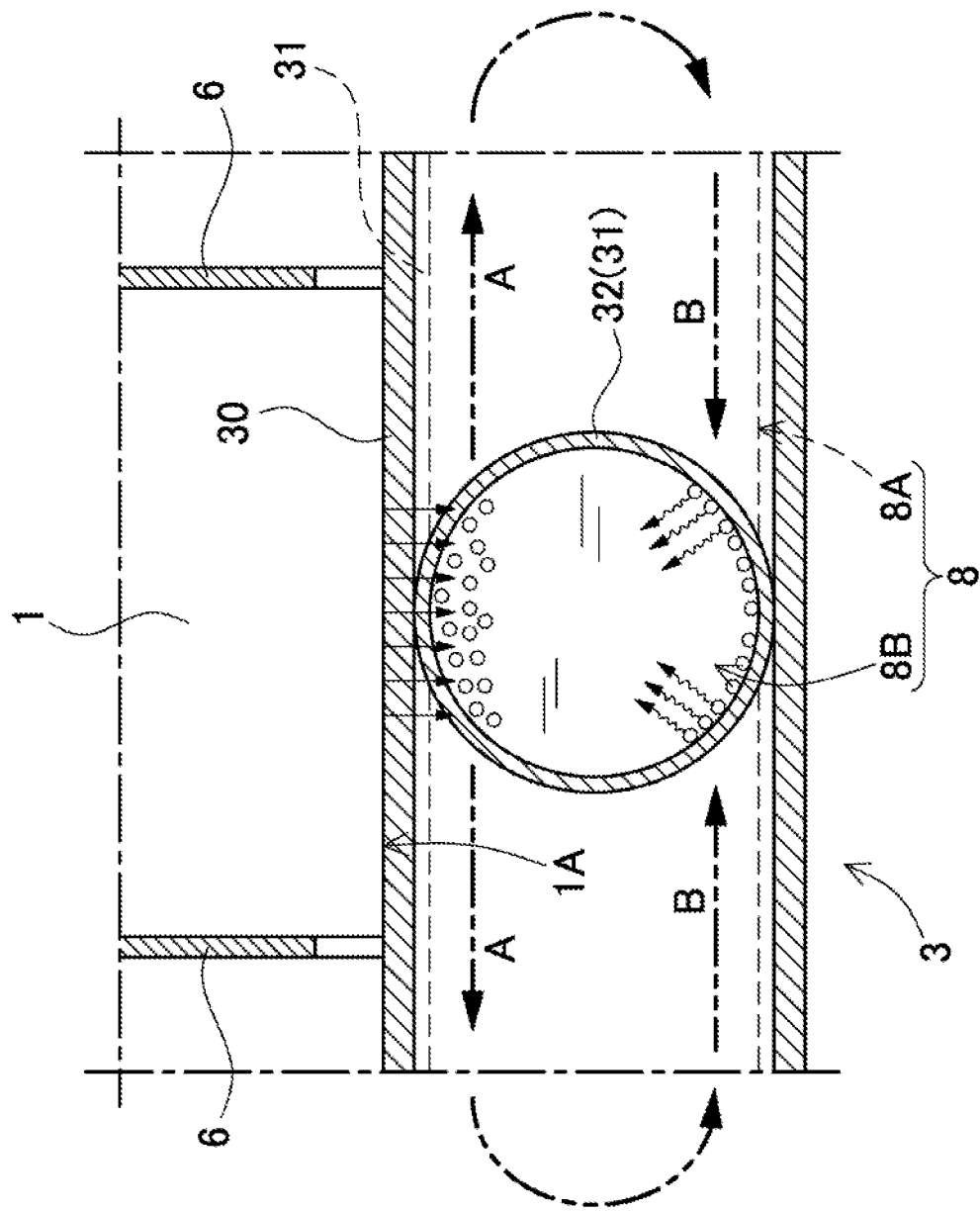
FIG. 5 is an enlarged vertical sectional view of the cooling plate thermally coupled to a battery cell undergoing a thermal runaway.

The coolant that has cooled a portion of cooling plate 3 by the heat of vaporization generated by the boiling coolant vaporizes and expands, and then circulates in the lateral coolant passages 8B and the longitudinal coolant passages 8A around the heated portion, thereby being pushed from the heated portion to the surrounding area. This is because the volume of the boiled and vaporized coolant increases 1200 times at atmospheric pressures. FIG. 5 is an enlarged vertical sectional view of cooling plate 3 thermally coupled to battery cell 1 undergoing a thermal runaway. Lateral coolant passage 8B is indicated by the solid lines, and longitudinal coolant passage 8A is indicated by the chain lines. This figure shows a section of a heated portion of cooling plate 3 of which upper surface is thermally coupled to battery cell 1. In FIG. 5, the heated portion of cooling plate 3 receives heat energy transferred from above, and its upper portion is heated to a temperature higher than its lower portion. When battery cell 1 undergoes a thermal runaway and is heated to several hundreds of degrees Celsius or more, the coolant contacting the inner surface of coolant passage 8 boils and vaporizes. The boiling coolant forcedly cools cooling plate 3 with the heat of vaporization. The boiled and vaporized coolant expands, and is pushed away from the heated portion, and the coolant in longitudinal coolant passage 8A moves in both directions as indicated by the arrows A and the coolant in lateral coolant passage 8B moves in the directions perpendicular to the drawing plane. The coolant moving outwardly from the heated portion is forwarded to an area away from the heated portion and cooled by cooling plate 3, and liquefies in an area where the coolant cools to a temperature below its boiling point. A large amount of heat energy is generated instantaneously by a thermal runaway, but during suspension of charging/discharging, there is no supply of external energy, and thus the total amount of heat energy generated by a thermal runaway depends on the remaining capacity of the battery undergoing a thermal runaway. Therefore, if the heat energy generated by a thermal runaway can be absorbed by a large amount of heat of vaporization of the boiling coolant, a chain of thermal runaway among adjacent battery cells can be prevented even when the pump is not operable, such as when a power source device is not operated. According to the above configuration, battery cell 1 undergoing a thermal runaway instantaneously heats a portion of cooling plate 3, but this heat energy is absorbed by a large amount of heat of vaporization of the boiling coolant. Specifically, cooling plate 3 is cooled by the heat of vaporization of the boiling coolant when the heated portion of cooling plate 3 where battery cell 1 undergoing a thermal runaway is thermally coupled reaches an abnormally high temperature. Further, the thermal runaway locally heats cooling plate 3, so that a temperature rise of cooling plate 3 is lower in an area away from the heated portion than in the heated portion. In particular, in cooling plate 3 that forcedly cools the heated portion with a large amount of heat of vaporization of the boiling coolant, a temperature rise is small in an area away from the heated portion. Therefore, the vaporized and expanded coolant that has been boiled at the heated portion to be pushed to the surroundings is cooled to a temperature lower than the boiling point of the coolant and liquefies in an area away from the heated portion. The liquefied coolant, which is reduced in volume, flows on a bottom surface of coolant passages 8 in the directions indicated by arrows B, and circulates toward the heated portion. The coolant circulating between the heated portion and an area away from the heated portion boils at the heated portion and liquefies in the area away from the heated portion to self-circulate inside cooling plate 3, thereby cooling the heated portion. The coolant that self-circulates to cool the heated portion cools the heated portion with the heat of vaporization, and is cooled to liquefy by cooling plate 3 in an area away from the heated portion. Even when the coolant cannot be forced to circulate by circulation pump 21, cooling plate 3, which is configured to forcedly cool battery cells 1 with the self-circulating coolant, quickly transfers a large amount of heat energy generated spontaneously and locally due to thermal runaway to the surroundings of cooling plate 3, thereby effectively preventing a chain of thermal runaway.

If an inner surface of a lower portion of coolant passage 8 at the heated portion has a temperature higher than the boiling point of the coolant, the coolant is not circulated to the heated portion in a liquefied state. However, the vaporized and expanded coolant that has been boiled at the heated portion is liquefied in an area away from the heated portion, and thus the liquefied coolant that circulates toward the heated portion boils again at a midpoint in the circulation, thereby cooling cooling plate 3 with the heat of vaporization. Since the coolant is not circulated to the heated portion in a liquefied state, it does not cool the heated portion with the heat of vaporization, but it boils at a midpoint in the circulation toward the heated portion and cools cooling plate 3 with the heat of vaporization. Thus, cooling plate 3 is cooled by the heat of vaporization of the coolant in the vicinity of the heated portion. Therefore, cooling plate 3 in this state cools the vicinity of the heated portion by the heat of vaporization even though the heated portion is not cooled by the heat of vaporization of the coolant. In cooling plate 3 in which the vicinity of the heated portion is cooled, the cooled portion absorbs the heat energy of the heated portion, thereby lowering the temperature of the heated portion. Accordingly, even though the coolant is not circulated to the heated portion in a liquefied state, the heat of vaporization of the boiling coolant lowers the temperature of the heated portion, which prevents a chain of thermal runaway.

When a lower part of coolant passage 8 at the heated portion has a temperature lower than the boiling point of the coolant, the coolant is liquefied at the low temperature portion of cooling plate 3 and circulated to the heat generating portion. The coolant that has been liquefied and circulated to the heated portion is boiled again and cools the heated portion of cooling plate 3 with the heat of vaporization, and expanded outwardly in a vaporized state. When the lower part of coolant passage 8 at the heated portion of cooling plate 3 has a temperature higher than the boiling point of the coolant, the coolant is not circulated to the heated portion in a liquefied state. However, in this state, the vaporized coolant flows to an area away from the heated portion, and is cooled and liquefied in the area. The liquefied coolant flows on the lower part of coolant passage 8 toward the heated portion, but when the lower part at the heated portion has a temperature higher than its boiling point, the coolant boils again in a midpoint in the circulation and cools cooling plate 3 by the heat of vaporization. The coolant that boils in a midpoint in the circulation cools cooling plate 3 with the heat of vaporization at an area in approaching the heated portion.

As described above, the coolant configured to self-circulate in longitudinal coolant passages 8A and lateral coolant passages 8B repeats vaporization and liquefaction, thereby absorbing the heat of vaporization by boiling at the heated portion of cooling plate 3 and releasing the heat of vaporization by liquefying in an area away from the heated portion. The coolant that is boiling at the heated portion absorbs heat energy from cooling plate 3 and cools cooling plate 3, and the coolant that is liquefying in an area away from the heated portion releases the heat of vaporization and transfers the absorbed heat energy to cooling plate 3. Cooling plate 3 quickly transfers the heat energy of the heated portion to the surroundings by causing the coolant to self-circulate quickly in both longitudinal coolant passages 8A and lateral coolant passages 8B, thereby dissipating the heat energy.

Coolant passages 8 are connected to circulation pump 21 and radiator 22 to form circulation passage 20 for the coolant as a closed loop. Therefore, when the coolant boils at the heated portion, the internal pressure in the closed loop rises. The boiling point of the coolant rises as the internal pressure increases. For example, the boiling point of cooling water is 100° C. at 1 atmospheric pressure, but rises to 120° C. at 2 atmospheric pressure. When the coolant boils in the closed loop, the internal pressure of coolant passages 8 rises and the boiling point of the coolant also rises. The boiling point of the cooling water rises as the internal pressure increases. The internal pressure rises as the coolant boils and falls as the coolant liquefies, since the coolant in the closed-loop coolant passages 8 liquefies when cooled to a temperature lower than the boiling point and liquefies in an area away from the heated portion. In particular, increased internal pressure of coolant passages 8 raises the boiling point of the coolant, which makes the coolant become less likely to boil, so that the boiled coolant easily liquefies when moving away from the heated portion and being cooled. In coolant passages 8, the coolant boils at the heated portion, and moves away from the heated portion and liquefies. Thus, the internal pressure in coolant passages 8 is balanced since coolant passages 8 have a portion with boiling coolant and another portion with liquefying coolant. Since cooling plate 3, circulation pump 21, and radiator 22 are connected in a closed loop, the coolant self-circulates in the closed loop, while boiling at the heated portion to absorb the heat energy and liquefying in a state separated from the heated portion by being cooled to a temperature lower than its boiling point. The coolant, which self-circulates while repeating vaporization and liquefaction, efficiently cools the heated portion by dissipating the heat energy of the heated portion into a distant area, and in addition, boiling and expanding of the coolant facilitates efficient self-circulation of the coolant to cool the heated portion.

Cooling plate 3 shown in the enlarged vertical sectional view of FIG. 5 includes coolant passage 8 having a circular cross-section inside metal plate unit 30. Cooling plate 3 has a shape in which upper and lower surfaces thereof are connected with each other with vertically connecting parts 32 each disposed between coolant passages 8. Each vertically connecting part 32 is located between adjacent coolant passages 8 and transfers the heat energy from battery cells 1 to the lower surface of cooling plate 3. When an upper surface of vertically connecting part 32 is heated by battery cell 1 undergoing a thermal runaway, heat energy is transferred from top to bottom. Both sides of vertically connecting parts 32 are exposed to adjacent coolant passages 8 to contact the coolant. As shown in FIG. 5, the gaseous coolant, which has boiled by contacting the inner surface of coolant passage 8, is moved away from the heated portion while flowing in an upper portion of coolant passage 8, and the coolant, which has been cooled and liquefied in an area away from the heated portion, circulates toward the lower portion of coolant passage 8. In the heated portion, an exposed surface of a lower portion of vertically connecting part 32 contacts the liquefied coolant to heat and boil the coolant. Accordingly, the coolant circulated to the heated portion is heated and boiled on the exposed surface of vertically connecting part 32, and is cooled by the heat of vaporization of the cooling water.

Figure 6:
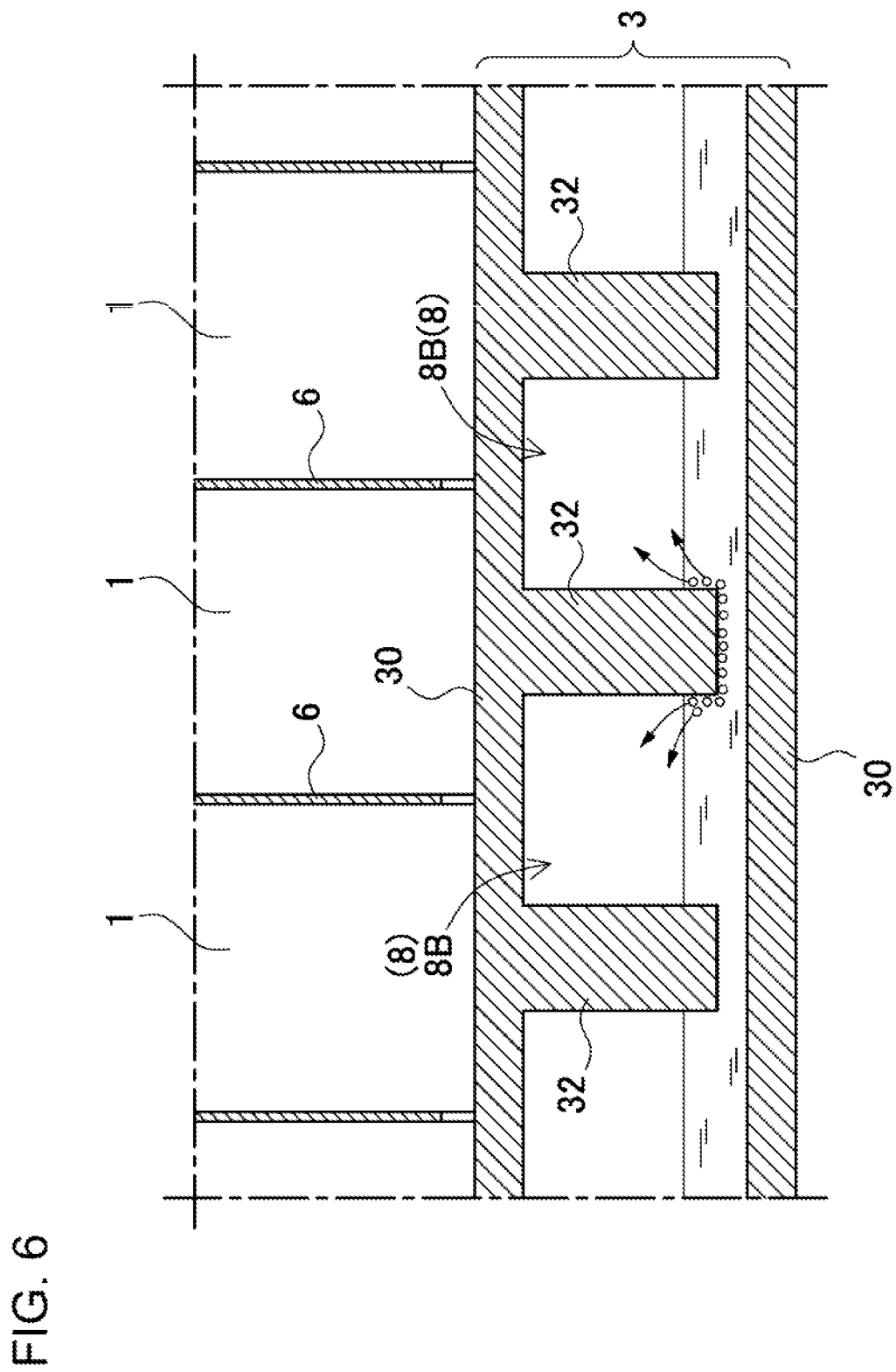
FIG. 6 is an enlarged vertical sectional view showing another example of the cooling plate.

Cooling plate 3 shown in the enlarged vertical sectional view of FIG. 6 includes coolant passages 8 having a quadrilateral cross-section inside metal plate unit 30. Cooling plate 3 has a shape in which upper and lower surfaces thereof are connected with each other with vertically connecting parts 32 each disposed between coolant passages 8. Each vertically connecting part 32 is located between adjacent coolant passages 8 and transfers the heat energy from battery cells 1 to the lower surface of cooling plate 3. When an upper surface of vertically connecting part 32 is heated by battery cell 1 undergoing a thermal runaway, heat energy is transferred from top to bottom. Both sides of vertically connecting parts 32 are exposed to adjacent coolant passages 8 to contact the coolant. In cooling plate 3 of FIG. 6, an upper portion of an inner surface of each coolant passage 8 is in contact with the boiling and vaporized coolant, and a lower portion thereof is in contact with the liquefied coolant. In the heated portion, a surface of a lower portion of vertically connecting part 32 contacts the liquefied coolant to heat and boil the coolant. Therefore, the coolant circulated to the heated portion is heated and boiled on the surface of vertically connecting part 32 that is exposed to coolant passage 8, and is cooled by the heat of vaporization of the cooling water.

Figure 7:
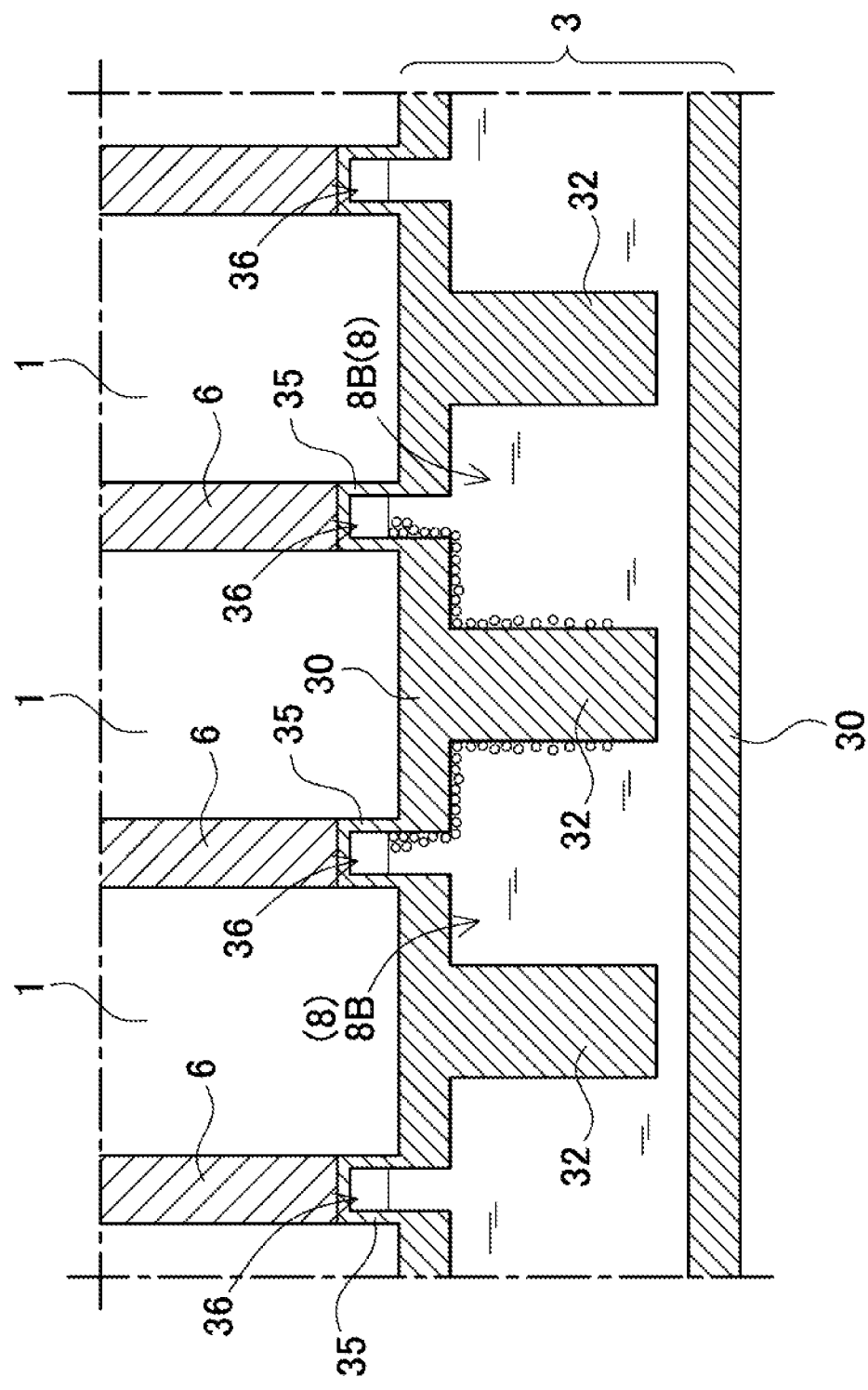
FIG. 7 is an enlarged vertical sectional view showing another example of the cooling plate.

Cooling plate 3 shown in the enlarged sectional view of FIG. 7 includes cooling protrusions 35 that are thermally coupled to surfaces of battery cells 1. Each cooling protrusion 35 protrudes on a surface of cooling plate 3 on which battery cells 1 are to be placed, and is disposed between adjacent battery cells 1. Cooling protrusion 35 has either side thereof thermally coupled to a surface of battery cell 1, and has hollow portion 36 inside cooling protrusion 35 that is joined to coolant passage 8. Cooling protrusion 35 allows an inner surface of hollow portion 36 to be cooled with the coolant in coolant passage 8, thereby cooling battery cells 1 in contact with a surface of cooling protrusion 35. Hollow portion 36 of cooling protrusion 35 also serves as a gas pool of the gaseous coolant heated and boiled by battery cell 1 undergoing a thermal runaway. In this figure, separators 6 having the same thickness as cooling protrusions 35 are respectively arranged on upper surfaces of cooling protrusions 35, and each battery cell 1 is arranged between adjacent separators 6.

Figure 8:
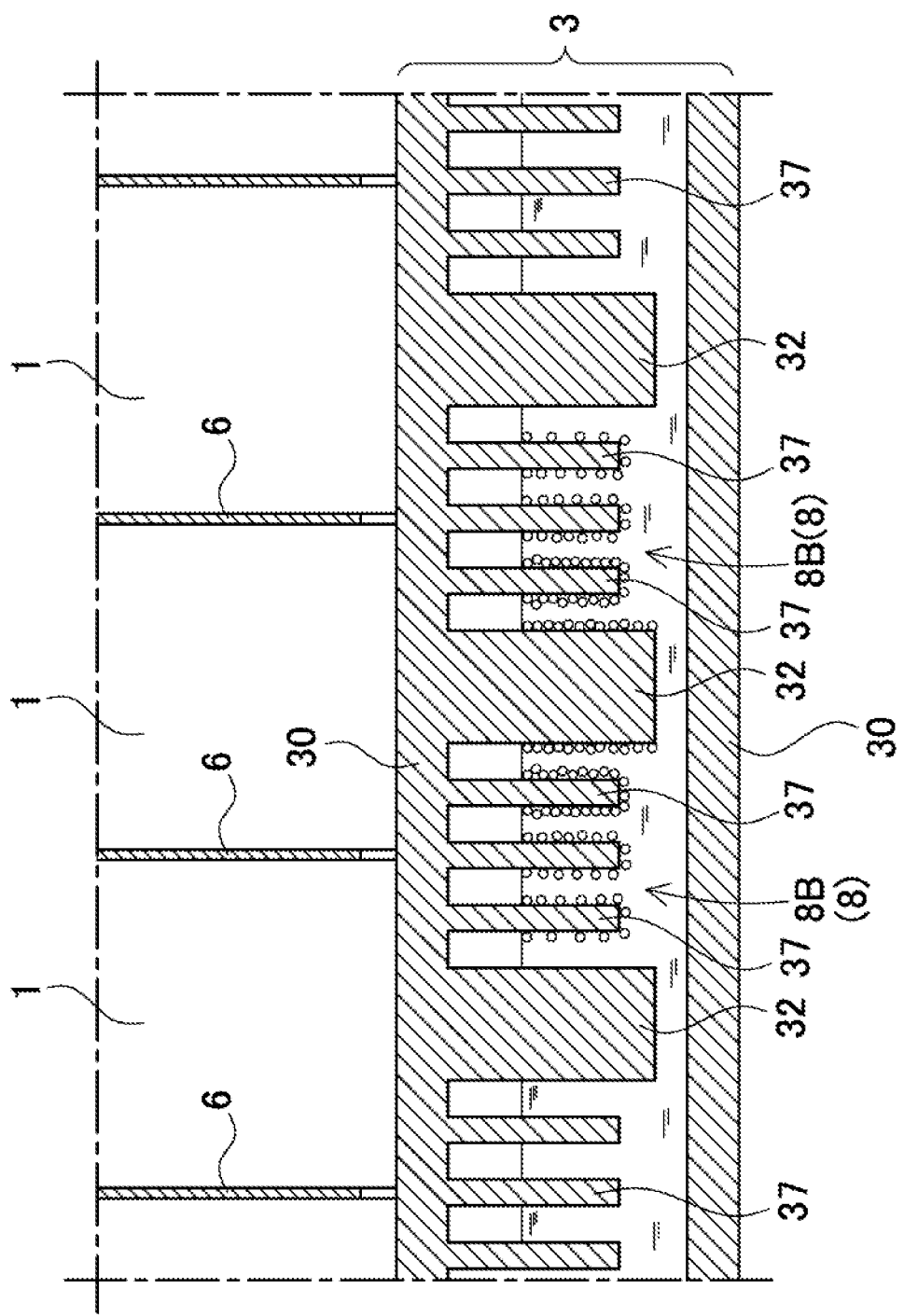
FIG. 8 is an enlarged vertical sectional view showing another example of the cooling plate.
Figure 9:
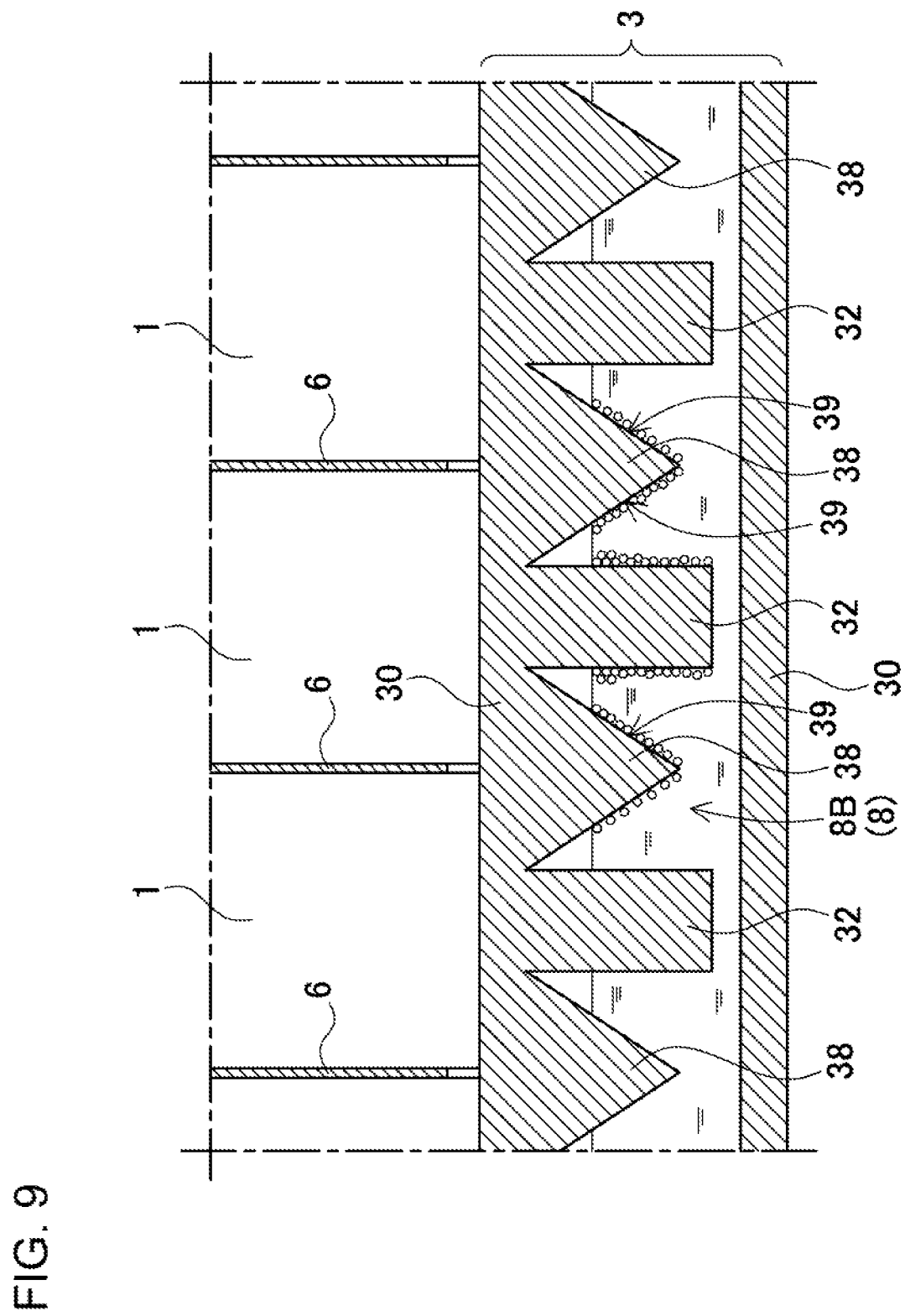
FIG. 9 is an enlarged vertical sectional view showing another example of the cooling plate.

Further, cooling plates 3 shown in FIGS. 8 and 9 include protrusions 37, 38 on an upper surface of coolant passage 8 at a portion of cooling plate 3 where battery cells 1 are thermally coupled. Cooling plate 3 of FIG. 8 includes columns of protrusions 37 protruding downward from the upper surface of coolant passage 8. Protrusions 37 in this figure each have a plate shape extending in a width direction of battery cell 1, and columns of protrusions 37 are arranged in parallel to each other. A structure with columns of protrusions 37 like this increases a surface area of entire protrusions, thereby enabling effective cooling as cooling fins having an increased contact area with the coolant, and also allowing the coolant to flow along the surfaces of protrusions 37. Although protrusions 37 shown in FIG. 8 have a shape extending in the width direction of battery cells 1, the protrusions may have a shape extending in a thickness direction and may be arranged in the width direction of the battery cells.

Cooling plate 3 shown in FIG. 9 includes chevron-shaped protrusions 38 protruding downward from an upper surface of coolant passage 8. Protrusions 38 in this figure each have a ridge shape extending in a width direction of battery cells 1 and gradually tapered downward, surfaces of which are inclined surfaces 39. Protrusions 38 having a shape like this allows the coolant to flow along inclined surfaces 39, thereby causing the coolant to effectively self-circulate in coolant passage 8. Although protrusions 38 shown in FIG. 9 have a shape extending in the width direction of battery cells 1, the protrusions may have a shape extending in the thickness direction of the battery cells. A plurality of the chevron-shaped protrusions extending in the thickness direction of the battery cells may be arranged in the width direction of the battery cells. This structure can facilitate self-circulation of the coolant that moves along the inclined surfaces in each region, while dividing the coolant passages extending in the width direction of the battery cells into a plurality of regions with the plurality of protrusions. The chevron-shaped protrusions extending in the thickness direction of the battery cells may have a shape inclined toward either side thereof from the middle portion in the width direction of the battery cells. These protrusions can facilitate self-circulation of the coolant that flows from the middle portion in the width direction of the battery cells toward either side thereof along the inclined surfaces.

As described above, cooling plate 3 in FIGS. 8 and 9 can achieve efficient cooling by arranging protrusions 37, 38 protruding downward from the upper surface of coolant passage 8 in a state of being immersed in the coolant. In particular, even when gas generated by vaporization of the coolant in coolant passage 8 forms a gas layer between an upper surface of coolant passage 8 and the liquid surface of the coolant, cooling plate 3 can achieve efficient cooling without reducing the cooling efficiency by allowing lower portions of protrusions 37, 38 and inclined surfaces 39 provided in coolant passage 8 to contact the coolant.

In an example shown in FIG. 9, although inclined surfaces 39 are disposed on the surface of protrusions 38 protruding downward from the upper surface of cooling passage 8, the cooling passage can facilitate self-circulation of the coolant by arranging the inclined surfaces on the surfaces of the vertically connecting parts to allow the coolant to flow along the inclined surfaces (not shown). Note that, in this specification, the term "inclined surface" is used in a broad sense including a curved surface.

Figure 10:
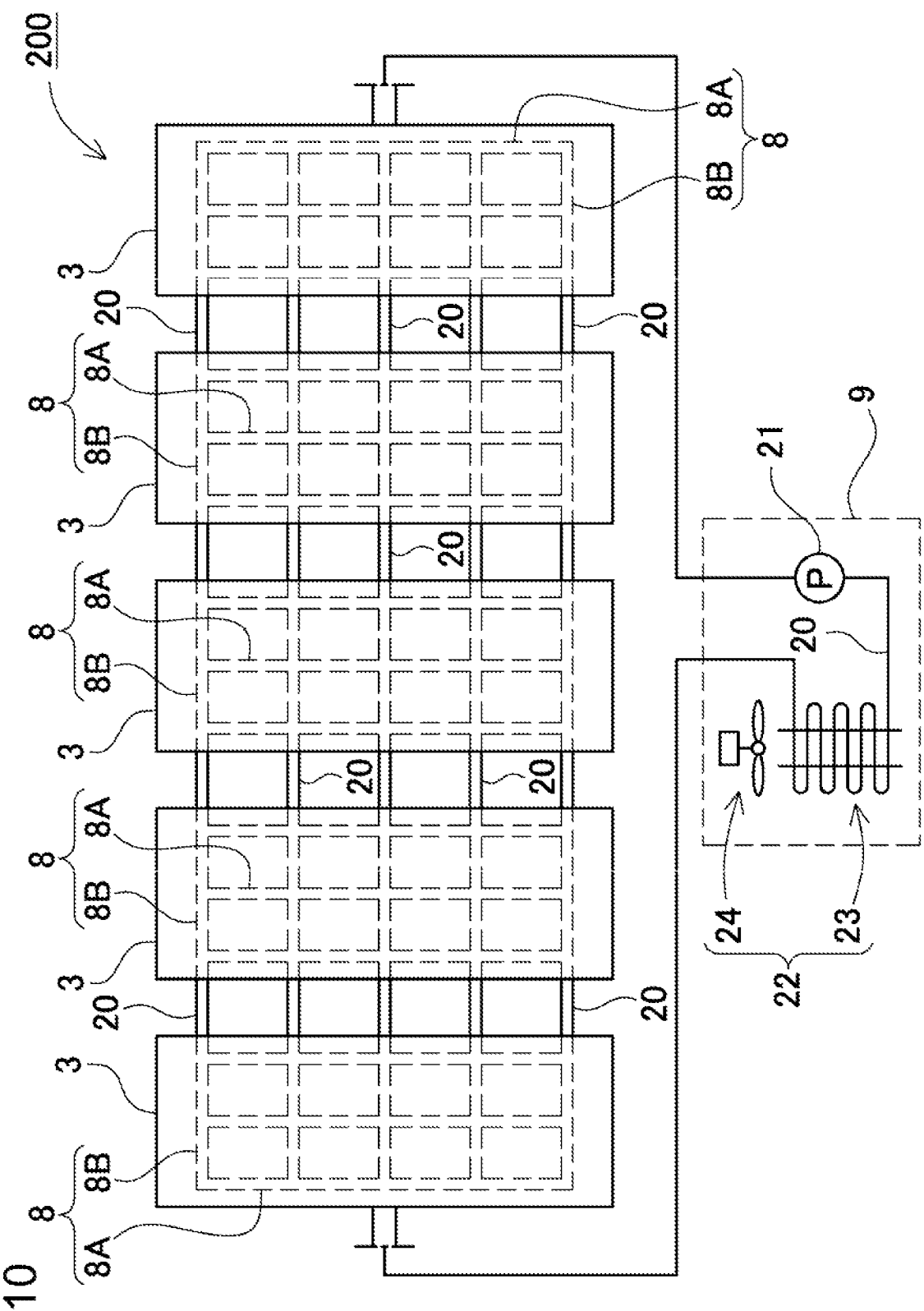
FIG. 10 is a schematic configuration diagram of a power source device according to another exemplary embodiment of the present invention.

In power source device 200 of FIG. 10, a plurality of cooling plates 3 are arranged in parallel and coolant passages 8 of cooling plates 3 are joined together. A battery unit (not shown) is placed on each cooling plate 3 in a thermally coupled state to forcedly cool the battery cells of the battery unit. Adjacent cooling plates 3 are joined together in a lattice shape with vertically and horizontally extending coolant passages 8 as indicated by the chain lines in FIG. 10. In the power source device, when one battery cell thermally coupled to one of cooling plates 3 undergoes a thermal runaway and generate heat, the coolant in coolant passages 8 is heated by the heat-generating battery cell and vaporizes. The vaporized coolant expands and is forced to flow into coolant passages 8. The vaporized coolant that flows in cooling plates 3 is cooled and liquefied in a portion that is thermally coupled to another battery cell that is not undergoing a thermal runaway. The liquefied coolant is circulated in the coolant passages to cool the battery cells in the vicinity of the battery cell undergoing a thermal runaway, thereby preventing a thermal runaway in those battery cells.

Figure 11:
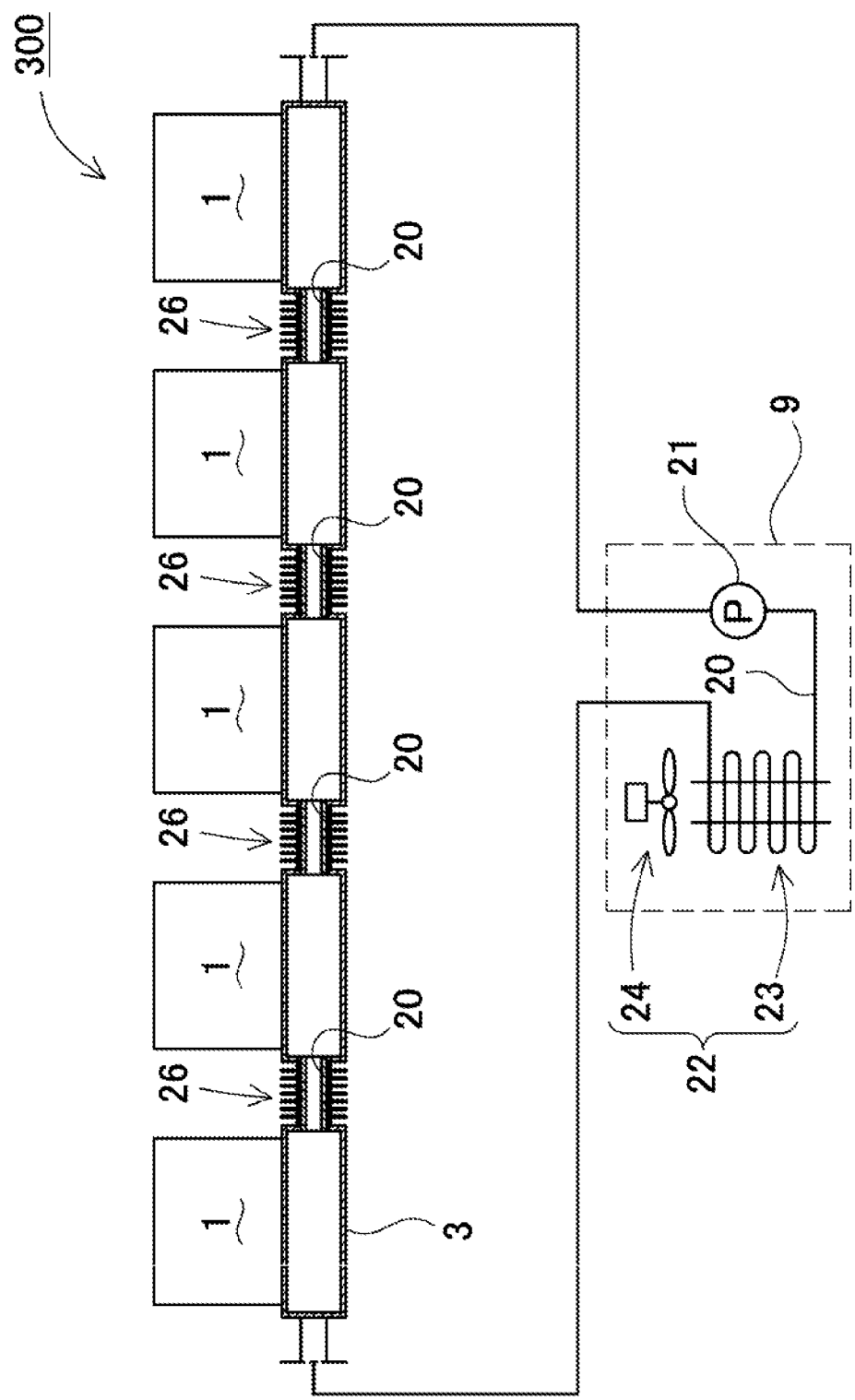
FIG. 11 is a schematic sectional view of a power source device according to another embodiment of the present invention.

Power source device 300 of FIG. 11 includes radiators 26 in circulation passage 20 that joins adjacent cooling plates 3 together. Radiators 26 cool the circulating coolant and allows the coolant to circulate in cooling plates 3. In power source device 300, even when one cooling plate 3 is heated by one battery cell 1 undergoing a thermal runaway and generating heat and the coolant of heated cooling plate 3 is heated, the heated coolant is circulated to adjacent cooling plate 3 after being cooled by a radiator 26. This configuration allows the coolant to be circulated from one cooling plate 3 thermally coupled to battery cell 1 undergoing a thermal runaway to another cooling plate 3 to circulate after lowering its temperature. Power source device 300 shown in FIG. 11 includes radiators 26 protruding outward from an outer peripheral surface of circulation passage 20. However, the power source device may include radiators protruding inwardly from an inner peripheral surface of the circulation passage.

Figure 12:
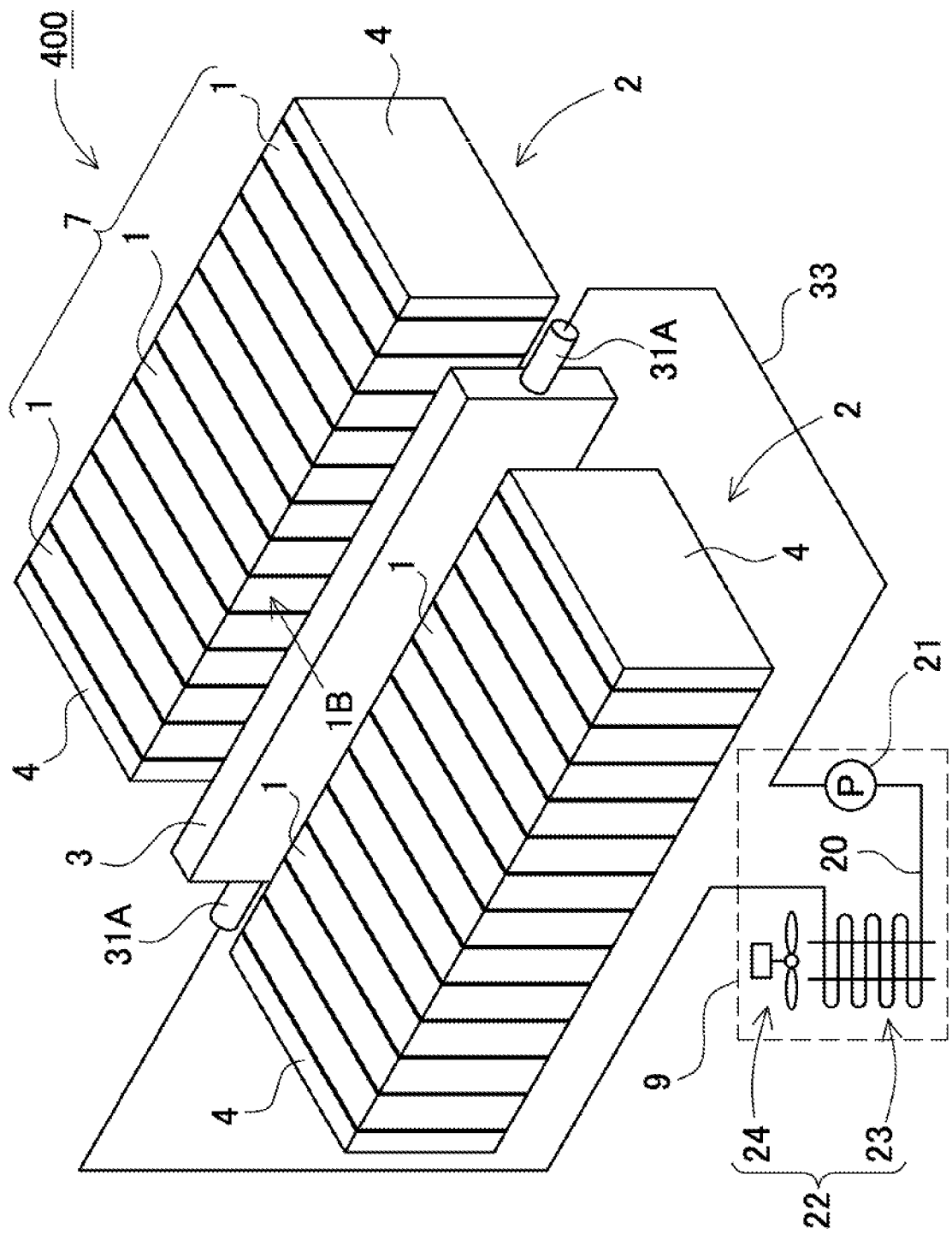
FIG. 12 is a schematic perspective view of a power source device according to another embodiment of the present invention.
Figure 13:
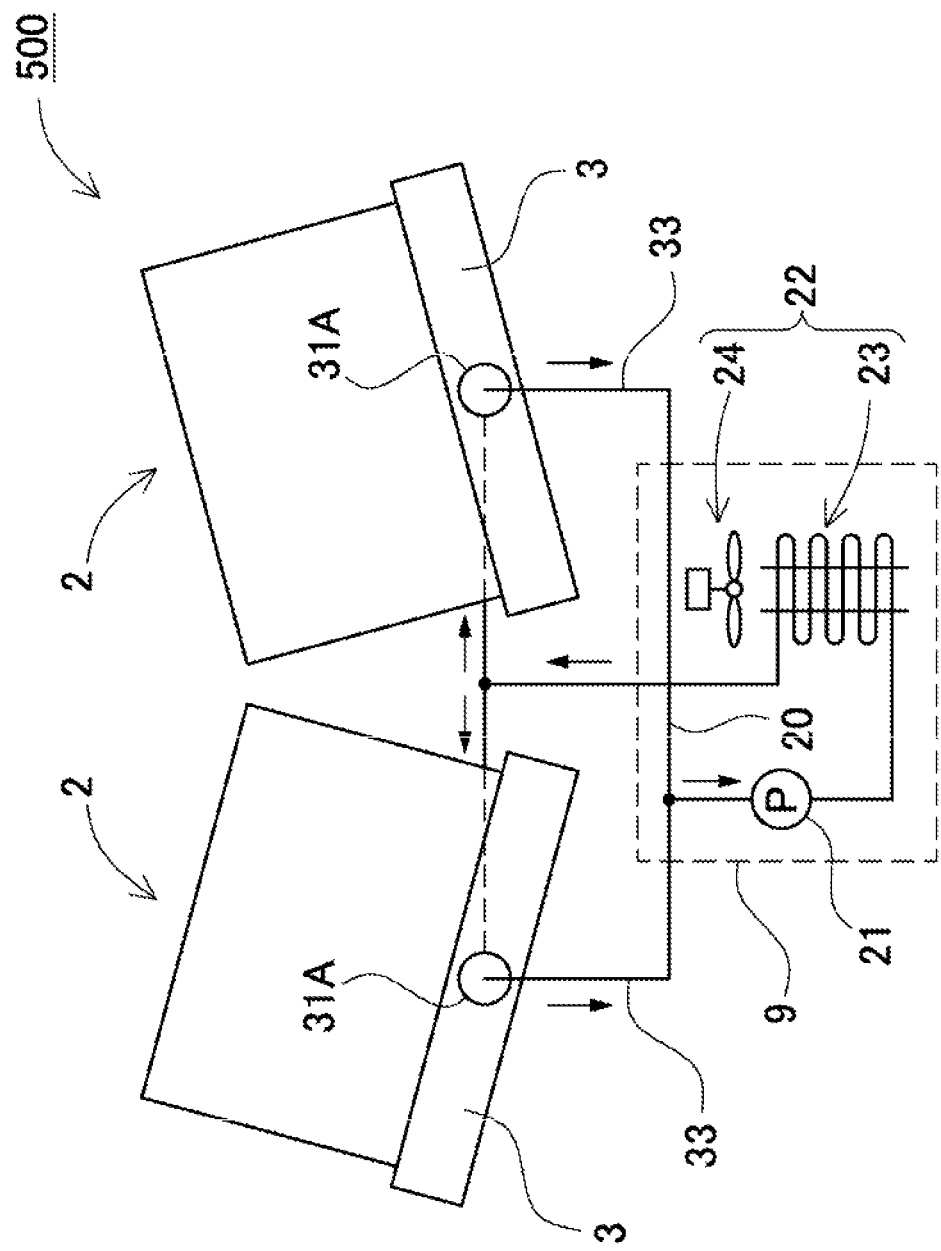
FIG. 13 is a schematic front view of a power source device according to another embodiment of the present invention.

Power source device 400 of FIG. 12 includes cooling plate 3 arranged in a vertical posture, and power source device 500 of FIG. 13 includes cooling plates 3 in an inclined posture. In power source device 400 of FIG. 12, battery cells 1 are arranged in a manner that side surfaces 1B thereof that are thermally coupled to vertically arranged cooling plate 3 extend in a vertical direction of cooling plate 3. In power source device 500 of FIG. 13, battery cells 1 are arranged in a manner that bottom surfaces 1A thereof that are thermally coupled to cooling plates 3 extend in an inclined directions of cooling plates 3. In power source devices 400, 500, the liquefied coolant is gathered in a lower portion of cooling plate 3 while part of the coolant is boiled and vaporized, so that the liquefied coolant can absorb heat energy of battery cell 1 undergoing a thermal runaway more efficiently. This is because the liquefied coolant gathered in the lower portion of cooling plate 3 is thermally coupled to battery cell 1 undergoing a thermal runaway via cooling plate 3.

Cooling plate 3 includes metal pipe 31 made of stainless steel embedded therein as longitudinal coolant passages 8A and lateral coolant passages 8B. Either end of metal pipe 31 projects from plate unit 30 to form connecting end 31A. Cooling plate 3 cools plate unit 30 with a coolant circulated in the stainless pipe. Plate unit 30 is disposed in a thermally coupled state with battery unit 2 to cool battery cells 1. Cooling plate 3 including metal pipe 31 for circulating the coolant as described above can reliably prevent liquid leakage inside cooling plate 3. Further, cooling plate 3 including plate unit 30 with metal pipe 31 embedded therein has excellent heat conduction between metal pipe 31 and plate unit 30, and thus efficiently cools battery cells 1 by efficiently cooling plate unit 30 with the coolant circulating in metal pipe 31. Further, plate unit 30 formed of a sheet of metal has a large heat capacity and can efficiently absorb the heat generated by battery cells 1 to limit the temperature rise of battery cells 1. In addition, plate unit 30 can cool battery cells 1 even after the circulation of the coolant is stopped. Note that, however, the present invention does not limit the structure of cooling plate 3 to the above structure. The cooling plate may have any structure capable of cooling its surface by circulation of the coolant, for example, a structure in which the metal pipe is fixed to the surface of a metal sheet, or a structure in which the metal pipe is disposed between two metal sheets.

(Circulator 9)

As shown in FIGS. 1 and 4, the above described power source device includes circulator 9 configured to circulate the coolant in coolant passage 8 of cooling plate 3. Circulator 9 includes circulation pump 21 configured to force the coolant to flow in coolant passage 8, and radiator 22 configured to dissipate heat and cool the circulating coolant. Cooling plate 3 is connected to circulator 9 via coolant pipe 33, as shown in FIGS. 1 and 4. Coolant pipe 33 is a metal pipe. However, the coolant pipe is not necessarily a metal pipe, and may be any element that allows circulation of a coolant, such as a hose formed of a rubber-like elastic body. Therefore, in this specification, the term "pipe" is used in a broad sense including a hose.

Figure 14:
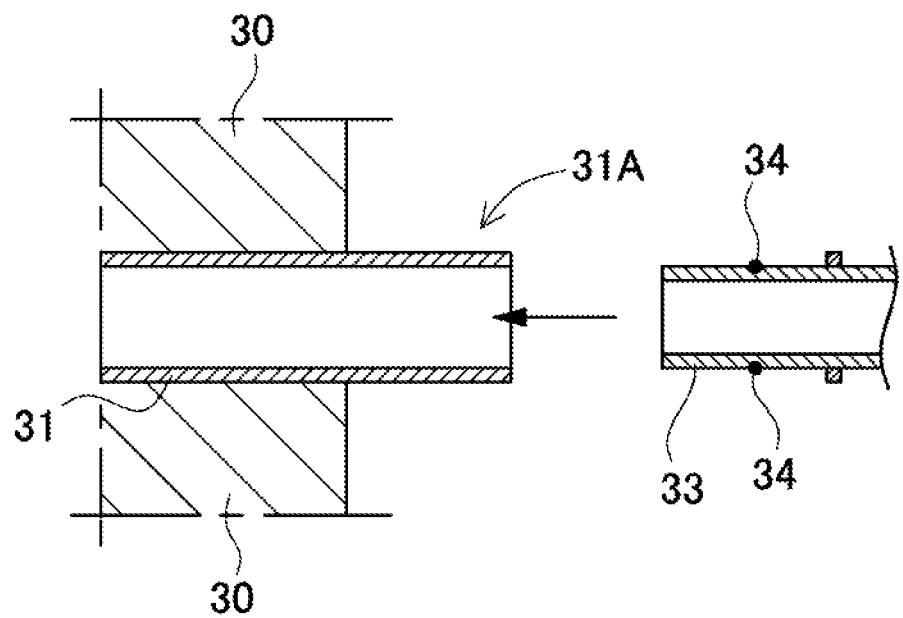
FIG. 14 is an enlarged sectional view showing a structure for connecting a connecting end of the cooling plate and a coolant pipe.

FIG. 14 is a sectional view showing a connecting structure between connecting end 31A included in cooling plate 3 and coolant pipe 33. In the connecting structure of this figure, coolant pipe 33 is inserted into connecting end 31A, and connecting end 31A and coolant pipe 33 are connected water-tightly with each other through O-ring 34 disposed therebetween. In this connecting structure, coolant pipe 33 may be a metal pipe so that coolant pipe 33 can be connected with connecting end 31A more reliably in a watertight structure. In order to dispose O-ring 34 at a fixed position, an outer surface of coolant pipe 33 or an inner surface of connecting end 31A may have a ring groove to receive O-ring 34, thereby preventing displacement of O-ring 34. With this connecting structure, coolant pipe 33 can be easily connected with connecting end 31A by simply inserting coolant pipe 33. In addition, coolant pipe 33 can be pulled out and easily detached. Since the coolant is not pressurized to a high pressure unlike the coolant, coolant pipe 33 can be easily attached to and detached from connecting end 31A by the above described connecting structure shown in FIG. 14.

Radiator 22 cools the circulating liquid coolant. Radiator 22 in FIGS. 1 and 4 includes heat exchanger 23 and fan 24, and cools the coolant circulated in heat exchanger 23 by forcedly blowing air with fan 24. Operation of fan 24 and circulation pump 21 is controlled by controlling circuit 25 configured to sense a battery temperature. Controlling circuit 25 is configured to sense the battery temperature with a temperature sensor (not shown) to control operation of circulation pump 21 and fan 24, and adjust a cooling state of cooling plate 3. When the battery temperature exceeds a set temperature, controlling circuit 25 operates circulation pump 21 and fan 24. When circulation pump 21 is operated, the coolant is circulated to cooling plate 3. When the battery temperature falls below a set temperature, controlling circuit 25 stops the operation of circulation pump 21 and fan 24. In this state, the coolant is not circulated in cooling plate 3, and cooling plate 3 is not forcedly cooled. Controlling circuit 25 stores a set temperature for operating circulation pump 21, and controls operation of circulation pump 21 at this set temperature to adjust the battery temperature within a set range.

(Power Source Device for Hybrid Automobiles)

Figure 15:
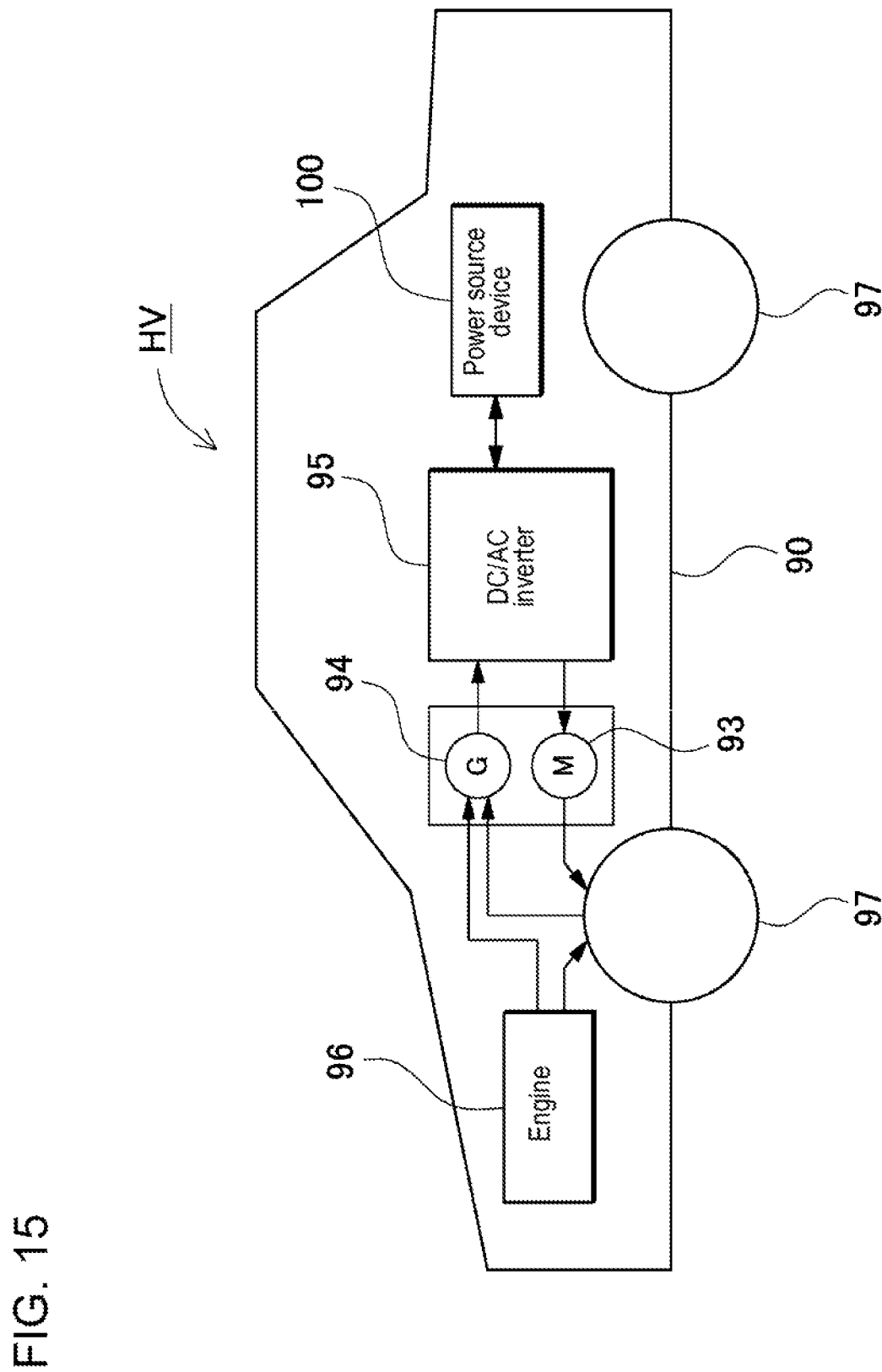
FIG. 15 is a block diagram showing an example in which the power source device is mounted on a hybrid automobile that runs on an engine and a motor.

FIG. 15 shows an example in which a power source device is mounted on a hybrid automobile that is driven by both an engine and a motor. Vehicle HV equipped with power source device 100 shown in this figure includes: engine 96 and traction motor 93 for driving vehicle HV; power source device 100 configured to supply electric power to motor 93; generator 94 configured to charge a battery of power source device 100; vehicle body 90 on which are mounted engine 96, motor 93, power source device 100, and generator 94; and wheels 97 that are driven by engine 96 or motor 93 to drive vehicle body 90. Power source device 100 is connected to motor 93 and generator 94 via DC/AC inverter 95. Vehicle HV is driven by both motor 93 and engine 96 while charging and discharging the battery of power source device 100. Motor 93 is driven when vehicle HV travels in a low-engine-efficiency area, for example, during acceleration or during low-speed-traveling. Motor 93 is driven by electric power supplied from power source device 100. Generator 94 is driven by engine 96 or driven by regenerative braking in braking the vehicle, and charges the battery of power source device 100.

(Power Source Device for Electric Automobiles)

Figure 16:
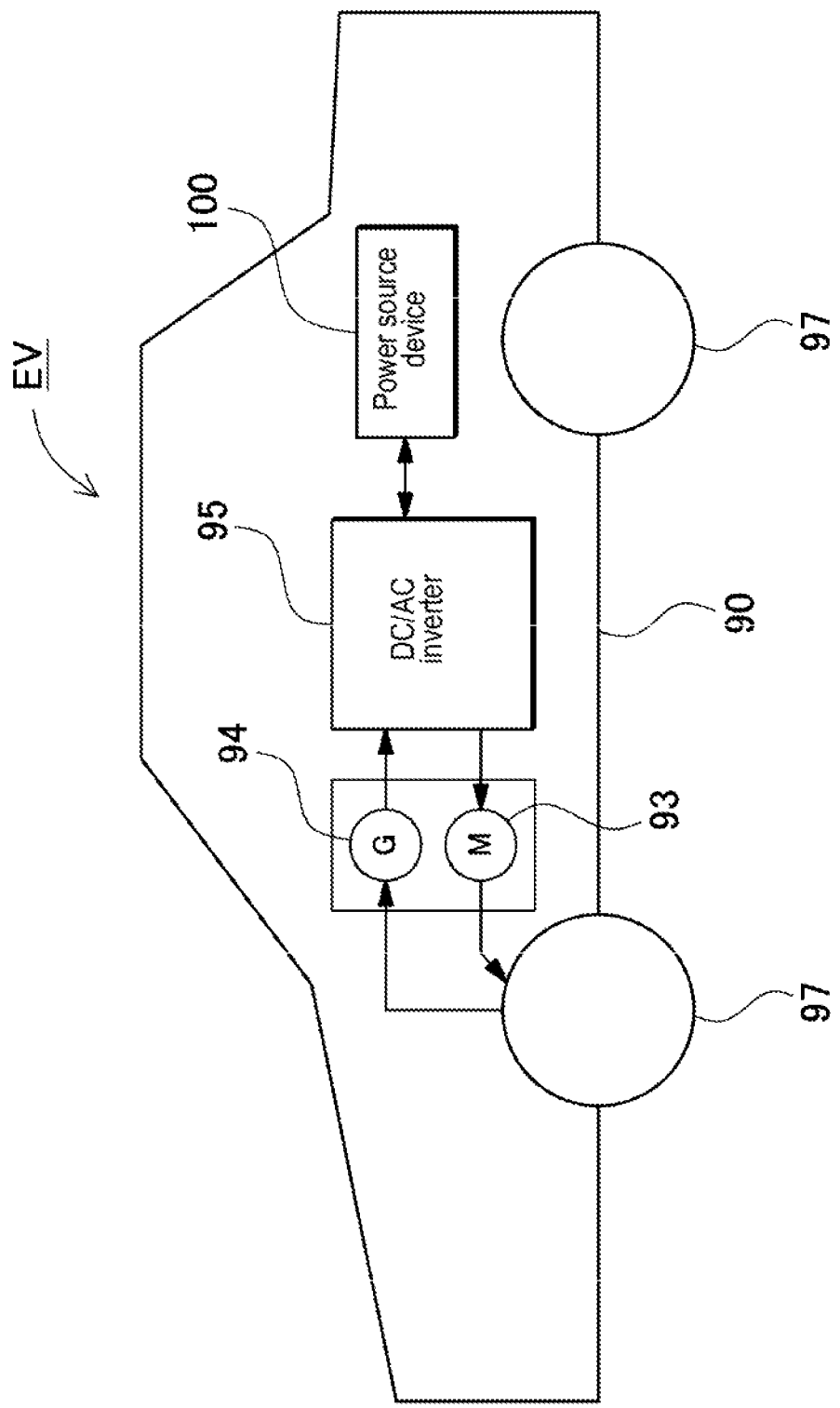
FIG. 16 is a block diagram showing an example in which the power source device is mounted on an electric automobile that runs only on a motor.

FIG. 16 shows an example in which the power source device is mounted on an electric automobile that is driven only by a motor. Vehicle EV equipped with power source device 100 shown in this figure includes: traction motor 93 for driving vehicle EV; power source device 100 configured to supply electric power to motor 93; generator 94 configured to charge a battery of power source device 100; vehicle body 90 on which are mounted motor 93, power source device 100, and generator 94; and wheels 97 that are driven by motor 93 to drive vehicle body 90. Power source device 100 is connected to motor 93 and generator 94 via DC/AC inverter 95. Motor 93 is driven by electric power supplied from power source device 100. Generator 94 is driven by energy for regeneratively braking vehicle EV, and charges the battery of power source device 100.

INDUSTRIAL APPLICABILITY

The power source device of the present invention can be suitably used as a power source for a motor that drives a vehicle, such as a hybrid car, a plug-in hybrid car, an electric automobile.

REFERENCE MARKS IN THE DRAWINGS 100, 200, 300, 400, 500: power source device
1: battery cell
1A: bottom surface
1B: side surface
2: battery unit
24: bottom surface
2B: side surface
3: cooling plate
4: end plate
5: connecting member
6: separator
7: battery stack
8: coolant passage
8A: longitudinal coolant passage
8B: lateral coolant passage
9: circulator
11: electrode terminal
12: bus bar
20: circulation passage
21: circulation pump
22: radiator
23: heat exchanger
24: fan
25: controlling circuit
26: radiator
30: plate unit
31: metal pipe
31A: connecting end
32: vertically connecting part
33: coolant pipe
34: O-ring
35: cooling protrusion
36: hollow portion
37: protrusion
38: protrusion
39: inclined surface
90: vehicle body
93: motor
94: generator
95: DC/AC inverter
96: engine
97: wheel
HV vehicle
EV vehicle

The invention claimed is:

1. A power source device comprising:
a plurality of battery cells;
a cooling plate thermally coupled to each of the plurality of battery cells and including a coolant passage; and
a circulator configured to circulate a coolant in the coolant passage of the cooling plate,
wherein the cooling plate has at least one surface thermally coupled to each of the plurality of battery cells,
the coolant passage includes:
longitudinal coolant passages each extending in a first direction and connected to an inlet side and an outlet side for the coolant; and
lateral coolant passages each extending in a second direction different from the first direction,
wherein the lateral coolant passages connect each two adjacent longitudinal coolant passages of the longitudinal coolant passages with each other at more than two locations including at least one intermediate location between opposite ends of the coolant passage in the first direction, and
the cooling plate has a structure for cooling that allows the coolant to flow in both the longitudinal coolant passages and the lateral coolant passages.

2. The power source device according to claim 1, wherein the longitudinal coolant passages are connected with the lateral coolant passages in a grid pattern,
the first direction is perpendicular to the second direction, and
the longitudinal coolant passages are disposed at regular intervals in the first direction, and the lateral coolant passages are disposed at regular intervals in the second direction.

3. The power source device according to claim 1, wherein
the coolant passage includes protrusions at portions of the cooling plate where the plurality of battery cells are thermally coupled, and the cooling plate has a structure for cooling that allows a coolant to flow along surfaces of the protrusions.

4. The power source device according to claim 1, wherein
the coolant passage includes inclined surfaces at portions of the cooling plate where the plurality of battery cells are thermally coupled, and
the cooling plate has a structure for cooling that allows a coolant to flow along the inclined surfaces.

5. The power source device according to claim 1, wherein each of the plurality of battery cells is a prismatic battery cell, and one or both of a bottom surface and a side surface of the prismatic battery cell is fixed to the cooling plate in a thermally coupled state.

6. An electric vehicle equipped with the power source device according to claim 1, the electric vehicle comprising:
the power source device;
a traction motor configured to receive power from the power source device;
a vehicle body including the power source device and the traction motor; and
wheels driven by the traction motor to run the vehicle body.

7. The power source device according to claim 2, wherein each of the plurality of battery cells is a prismatic battery cell, and one or both of a bottom surface and a side surface of the prismatic battery cell is fixed to the cooling plate in a thermally coupled state.

8. An electric vehicle equipped with the power source device according to claim 2, the electric vehicle comprising:
the power source device;
a traction motor configured to receive power from the power source device;
a vehicle body including the power source device and the traction motor; and
wheels driven by the traction motor to run the vehicle body.

9. The power source device according to claim 3, wherein each of the plurality of battery cells is a prismatic battery cell, and one or both of a bottom surface and a side surface of the prismatic battery cell is fixed to the cooling plate in a thermally coupled state.

10. An electric vehicle equipped with the power source device according to claim 3, the electric vehicle comprising:
the power source device;
a traction motor configured to receive power from the power source device;
a vehicle body including the power source device and the traction motor; and
wheels driven by the traction motor to run the vehicle body.

11. The power source device according to claim 4, wherein each of the plurality of battery cells is a prismatic battery cell, and one or both of a bottom surface and a side surface of the prismatic battery cell is fixed to the cooling plate in a thermally coupled state.

12. An electric vehicle equipped with the power source device according to claim 4, the electric vehicle comprising:
the power source device;
a traction motor configured to receive power from the power source device;
a vehicle body including the power source device and the traction motor; and
wheels driven by the traction motor to run the vehicle body.

* * * * *